(12) United States Patent
Holzer et al.

(10) Patent No.: US 11,783,443 B2
(45) Date of Patent: Oct. 10, 2023

(54) EXTRACTION OF STANDARDIZED IMAGES FROM A SINGLE VIEW OR MULTI-VIEW CAPTURE

(71) Applicant: Fyusion, Inc., San Francisco, CA (US)

(72) Inventors: Stefan Johannes Josef Holzer, San Mateo, CA (US); Matteo Munaro, San Francisco, CA (US); Martin Markus Hubert Wawro, Dortmund (DE); Abhishek Kar, Berkeley, CA (US); Pavel Hanchar, Minsk (BY); Krunal Ketan Chande, San Francisco, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 16/518,558

(22) Filed: Jul. 22, 2019

(65) Prior Publication Data

US 2020/0234398 A1 Jul. 23, 2020

Related U.S. Application Data

(60) Provisional application No. 62/795,434, filed on Jan. 22, 2019, provisional application No. 62/795,440, (Continued)

(51) Int. Cl.
*G06T 7/70* (2017.01)
*G06T 3/00* (2006.01)

(52) U.S. Cl.
CPC .............. *G06T 3/0037* (2013.01); *G06T 7/70* (2017.01); *G06T 2207/20044* (2013.01); *G06T 2207/30244* (2013.01); *G06T 2207/30248* (2013.01)

(58) Field of Classification Search
CPC ................. G06T 2200/08; G06T 17/00; G06T 2207/30248; G06T 17/10; G06T 19/003;
(Continued)

(56) References Cited

U.S. PATENT DOCUMENTS

| 5,764,306 A | 6/1998 | Steffano |
| 5,923,380 A | 7/1999 | Yang |

(Continued)

FOREIGN PATENT DOCUMENTS

| GB | 2573170 A | 10/2019 |
| WO | 2016064921 A1 | 4/2016 |

(Continued)

OTHER PUBLICATIONS

International Search Report and Written Opinion for App. No. PCT/US2021/013431, dated May 6, 2021, 10 pages.

(Continued)

*Primary Examiner* — Weiming He
(74) *Attorney, Agent, or Firm* — Kwan & Olynick LLP

(57) ABSTRACT

According to various embodiments, component information may be identified for each input image of an object. The component information may indicate a portion of the input image in which a particular component of the object is depicted. A viewpoint may be determined for each input image that indicates a camera pose for the input image relative to the object. A three-dimensional skeleton of the object may be determined based on the viewpoints and the component information. A multi-view panel corresponding to the designated component of the object that is navigable in three dimensions and that the portions of the input images in which the designated component of the object is depicted may be stored on a storage device.

12 Claims, 14 Drawing Sheets
(1 of 14 Drawing Sheet(s) Filed in Color)

Related U.S. Application Data filed on Jan. 22, 2019, provisional application No. 62/795,427, filed on Jan. 22, 2019.

(58) Field of Classification Search
CPC ............... G06T 19/00; G06T 2200/04; G06T 2207/20044; G06T 2207/30252; G06T 7/97; G06T 3/0031; G06T 7/194; G06T 7/55

See application file for complete search history.

(56) References Cited

U.S. PATENT DOCUMENTS

| | | | |
|---|---|---|---|
| 6,067,369 A | 5/2000 | Kamei | |
| 6,453,069 B1 | 9/2002 | Matsugu et al. | |
| 6,788,309 B1 | 9/2004 | Swan | |
| 6,879,956 B1 | 4/2005 | Honda | |
| 6,912,313 B2 | 6/2005 | Li | |
| 7,249,019 B2 | 7/2007 | Culy | |
| 7,292,257 B2 | 11/2007 | Kang | |
| 7,565,004 B2 | 7/2009 | Hashimoto | |
| 7,949,529 B2 | 5/2011 | Weider | |
| 9,182,229 B2 | 11/2015 | Grässer et al. | |
| 9,218,698 B2 | 12/2015 | Ricci | |
| 9,467,750 B2 | 10/2016 | Banica | |
| 9,495,764 B1 | 11/2016 | Boardman | |
| 9,886,636 B2 | 2/2018 | Zhang | |
| 9,886,771 B1 | 2/2018 | Chen | |
| 10,319,094 B1 | 6/2019 | Chen | |
| 10,373,387 B1 | 8/2019 | Fields | |
| 10,573,012 B1 | 2/2020 | Collins | |
| 10,636,148 B1 | 4/2020 | Chen | |
| 10,657,647 B1* | 5/2020 | Chen ..................... G06T 7/0046 |
| 10,698,558 B2 | 6/2020 | Holzer | |
| 10,893,213 B2 | 1/2021 | Magnuszewski | |
| 11,004,188 B2 | 5/2021 | Holzer | |
| 2002/0063714 A1 | 5/2002 | Haas | |
| 2002/0198713 A1 | 12/2002 | Franz | |
| 2004/0258306 A1 | 12/2004 | Hashimoto | |
| 2007/0253618 A1 | 11/2007 | Kim | |
| 2008/0101656 A1 | 5/2008 | Barnes | |
| 2008/0180436 A1 | 7/2008 | Kraver | |
| 2009/0289957 A1 | 11/2009 | Sroka | |
| 2010/0111370 A1 | 5/2010 | Black | |
| 2010/0251101 A1 | 9/2010 | Haussecker | |
| 2011/0218825 A1 | 9/2011 | Hertenstein | |
| 2013/0297353 A1 | 11/2013 | Strange | |
| 2014/0119604 A1 | 5/2014 | Mai | |
| 2014/0172245 A1 | 6/2014 | Soles | |
| 2015/0029304 A1 | 1/2015 | Park | |
| 2015/0097931 A1 | 4/2015 | Hatzilias | |
| 2015/0103170 A1 | 4/2015 | Nelson | |
| 2015/0125049 A1 | 5/2015 | Taigman | |
| 2015/0278987 A1 | 10/2015 | Mihara | |
| 2015/0317527 A1 | 11/2015 | Graumann | |
| 2015/0347845 A1 | 12/2015 | Benson | |
| 2015/0365661 A1 | 12/2015 | Hayashi | |
| 2016/0035096 A1 | 2/2016 | Rudow | |
| 2017/0109930 A1 | 4/2017 | Holzer | |
| 2017/0199647 A1 | 7/2017 | Richman | |
| 2017/0208246 A1 | 7/2017 | Kimura | |
| 2017/0277363 A1* | 9/2017 | Holzer ................ G06F 16/7867 |
| 2017/0293894 A1 | 10/2017 | Taliwal | |
| 2018/0027178 A1* | 1/2018 | Macmillan ............ H04N 13/10 348/38 |
| 2018/0160102 A1 | 6/2018 | Luo | |
| 2018/0190017 A1 | 7/2018 | Mendez | |
| 2018/0225858 A1 | 8/2018 | Ni | |
| 2018/0255290 A1 | 9/2018 | Holzer | |
| 2018/0260793 A1 | 9/2018 | Li | |
| 2018/0293552 A1 | 10/2018 | Zhang | |
| 2018/0315260 A1 | 11/2018 | Anthony | |
| 2018/0322623 A1 | 11/2018 | Memo | |
| 2018/0338126 A1 | 11/2018 | Trevor | |
| 2018/0349746 A1 | 12/2018 | Vallespi-Gonzalez | |
| 2019/0012394 A1 | 1/2019 | Endras | |
| 2019/0035165 A1 | 1/2019 | Gausebeck | |
| 2019/0066304 A1 | 2/2019 | Hirano | |
| 2019/0073641 A1 | 3/2019 | Utke | |
| 2019/0098277 A1 | 3/2019 | Takama | |
| 2019/0116322 A1 | 4/2019 | Holzer | |
| 2019/0147221 A1* | 5/2019 | Grabner .................... G06T 7/75 382/103 |
| 2019/0147583 A1 | 5/2019 | Stefan | |
| 2019/0164301 A1 | 5/2019 | Kim | |
| 2019/0189007 A1 | 6/2019 | Herman | |
| 2019/0196698 A1 | 6/2019 | Cohen | |
| 2019/0197196 A1 | 6/2019 | Yang | |
| 2019/0205086 A1 | 7/2019 | McNulty | |
| 2019/0317519 A1 | 10/2019 | Chen | |
| 2019/0318759 A1 | 10/2019 | Doshi | |
| 2019/0335156 A1 | 10/2019 | Rusu | |
| 2019/0349571 A1 | 11/2019 | Herman | |
| 2019/0392569 A1 | 12/2019 | Finch | |
| 2020/0111201 A1 | 4/2020 | Kuruvilla | |
| 2020/0118342 A1 | 4/2020 | Varshney | |
| 2020/0151860 A1 | 5/2020 | Safdarnejad | |
| 2020/0193675 A1* | 6/2020 | Burnett, III ........... G06T 15/005 |
| 2020/0231286 A1 | 7/2020 | Movsesian | |
| 2020/0233892 A1 | 7/2020 | Calhoun | |
| 2020/0234397 A1 | 7/2020 | Holzer | |
| 2020/0234398 A1 | 7/2020 | Holzer | |
| 2020/0234424 A1 | 7/2020 | Holzer | |
| 2020/0234451 A1 | 7/2020 | Holzer | |
| 2020/0234488 A1 | 7/2020 | Holzer | |
| 2020/0236296 A1 | 7/2020 | Holzer | |
| 2020/0236343 A1 | 7/2020 | Holzer | |
| 2020/0257862 A1 | 8/2020 | Kar | |
| 2020/0258309 A1 | 8/2020 | Holzer | |
| 2020/0312028 A1 | 10/2020 | Charvat | |
| 2020/0322546 A1 | 10/2020 | Carolus | |
| 2020/0349757 A1 | 11/2020 | Holzer | |

FOREIGN PATENT DOCUMENTS

| | | | |
|---|---|---|---|
| WO | 2017115149 A1 | 7/2017 | |
| WO | 2017195228 A1 | 11/2017 | |
| WO | 2019186545 | 10/2019 | |
| WO | 2019229912 | 12/2019 | |
| WO | 2020009948 A1 | 1/2020 | |
| WO | 2020125726 | 6/2020 | |
| WO | 2020154096 A1 | 7/2020 | |

OTHER PUBLICATIONS

Alberto Chavez-Aragon, et al., "Vision-Based Detection and Labelling of Multiple Vehicle Parts", 2011 14th International IEEE Conference on Intelligent Transportation Systems Washington, DC, USA. Oct. 5-7, 2011, 6 pages.

U.S. Appl. No. 16/518,501, CTFR—Final Rejection, dated Dec. 9, 2020, 16 pgs.

U.S. Appl. No. 16/518,501, Examiner Interview Summary Record (Ptol-413), dated Nov. 23, 2020, 2 pgs.

U.S. Appl. No. 16/518,501, Non-Final Rejection, dated Sep. 1, 2020, 15 pgs.

U.S. Appl. No. 16/518,512, Examiner Interview Summary Record (Ptol-413), dated Nov. 19, 2020, 3 pgs.

U.S. Appl. No. 16/518,512, Non-Final Rejection, dated Oct. 1, 2020, 24 pgs.

U.S. Appl. No. 16/518,512, Office Action Appendix, dated Nov. 19, 2020, 1 pg.

U.S. Appl. No. 16/518,558, Non-Final Rejection, dated Sep. 8, 2020, 14 pgs.

U.S. Appl. No. 16/518,585, Non-Final Rejection, dated Sep. 3, 2020, 13 pgs.

U.S. Appl. No. 16/596,516, Non-Final Rejection, dated Jun. 23, 2020, 37 pgs.

U.S. Appl. No. 16/596,516, Notice of Allowance and Fees Due (Ptol-85), dated Sep. 21, 2020, 10 pgs.

U.S. Appl. No. 16/692,133, Non-Final Rejection, dated Jul. 24, 2020, 17 pgs.

(56) References Cited

OTHER PUBLICATIONS

U.S. Appl. No. 16/692,170, Non-Final Rejection, dated Nov. 20, 2020, 13 pgs.
U.S. Appl. No. 16/692,219, Non-Final Rejection, dated Dec. 8, 2020, 9 pgs.
U.S. Appl. No. 16/861,100, Non-Final Rejection, dated Oct. 8, 2020, 11 pgs.
U.S. Appl. No. 16/518,512, Notice of Allowance dated Jan. 25, 2021, 7 pgs.
U.S. Appl. No. 16/518,512, Notice of Allowance dated Dec. 16, 2020, 9 pgs.
U.S. Appl. No. 16/518,558, Examiner Interview Summary dated Dec. 16, 2020, 1 pg.
U.S. Appl. No. 16/518,558, Final Office Action dated Dec. 16, 2020, 16 pgs.
U.S. Appl. No. 16/518,570, Non-Final Office Action dated Jan. 6, 2021, 2017 pgs.
U.S. Appl. No. 16/518,585, Notice of Allowance dated Dec. 14, 2020, 5 pgs.
U.S. Appl. No. 16/692,133, Notice of Allowance dated Dec. 15, 2020, 7pgs.
U.S. Appl. No. 16/692,170, Notice of Allowance dated Feb. 9, 2021, 8 pgs.
U.S. Appl. No. 16/861,100, Advisory Action dated Jun. 10, 2021, 3 pgs.
U.S. Appl. No. 16/861,100, Examiner Interview Summary dated Feb. 10, 2021, 2 pgs.
U.S. Appl. No. 16/861,100, Examiner Interview Summary dated Jun. 10, 2021, 1 pg.
U.S. Appl. No. 16/861,100, Examiner Interview Summary dated Jun. 3, 2021, 2 pgs.
U.S. Appl. No. 16/861,100, Final Office Action dated Feb. 26, 21, 15 pgs.
Gerd Lindner et al., "Structure-Preserving Sparsification of Social Networks", arXiv:1505.00564v1 [cs.SI] May 4, 2015, 8 pages.
Int'l Application Serial No. PCT/US20/12592, Int'l Search Report and Written Opinion dated Apr. 21, 2020, 9 pages.
International Search Report and Written Opinion for App. No. PCT/US2021/013471, dated May 6, 2021, 10 pages.
International Search Report and Written Opinion for App. No. PCT/US2021/013472, dated May 11, 2021, 10 pages.
Jeff Donahue et al., "DeCAF: ADeep Convolutional Activation Feature for Generic Visual Recognition", arXiv: 1310.153 |v| [cs.CV] Oct. 6, 2013, 10 pages.
Office Action (Final Rejection) dated Jan. 19, 2022 for U.S. Appl. No. 16/861,097 (pp. 1-16).
Office Action (Final Rejection) dated Jan. 19, 2022 for U.S. Appl. No. 16/861,100 (pp. 1-19).
Office Action (Final Rejection) dated Jan. 20, 2022 for U.S. Appl. No. 17/215,596 (pp. 1-16).
Office Action (Final Rejection) dated Mar. 3, 2022 for U.S. Appl. No. 17/174,250 (pp. 1-24).
Office Action (Final Rejection) dated Apr. 19, 2022 for U.S. Appl. No. 16/692,219 (pp. 1-13).
Office Action (Final Rejection) dated Dec. 7, 2021 for U.S. Appl. No. 16/518,501 (pp. 1-21).
Office Action (Final Rejection) dated Jun. 14, 2021 for U.S. Appl. No. 16/518,570 (pp. 1-24).
Office Action (Non-Final Rejection) dated Mar. 28, 2022 for U.S. Appl. No. 16/518,501 (pp. 1-21).
Office Action (Non-Final Rejection) dated Apr. 14, 2022 for U.S. Appl. No. 17/144,879 (pp. 1-12).
Office Action (Non-Final Rejection) dated Jun. 15, 2022 for U.S. Appl. No. 16/861,097 (pp. 1-17).
Office Action (Non-Final Rejection) dated Jun. 15, 2022 for U.S. Appl. No. 16/861,100 (pp. 1-18).
Office Action (Non-Final Rejection) dated Sep. 2, 2021 for U.S. Appl. No. 17/174,250 (pp. 1-22).
Office Action (Non-Final Rejection) dated Sep. 20, 2021 for U.S. Appl. No. 16/861,100 (pp. 1-19).
Office Action (Non-Final Rejection) dated Sep. 24, 2021 for U.S. Appl. No. 17/215,596 (pp. 1-14).
Office Action (Non-Final Rejection) dated Oct. 4, 2021 for U.S. Appl. No. 16/861,097 (pp. 1-15).
Office Action (Non-Final Rejection) dated Dec. 7, 2021 for U.S. Appl. No. 16/692,219 (pp. 1-12).
Office Action (Notice of Allowance and Fees Due (PTOL-85)) dated Apr. 7, 2022 for U.S. Appl. No. 17/215,596 (pp. 1-9).
Office Action (Notice of Allowance and Fees Due (PTOL-85)) dated Sep. 15, 2021 for U.S. Appl. No. 16/518,570 (pp. 1-8).
Office Action dated Jul. 16, 2021 for U.S. Appl. No. 16/518,501 (pp. 1-23).
Office Action dated Jun. 14, 2021 for U.S. Appl. No. 16/518,570 (pp. 1-24).
Office Action dated Jun. 15, 2022 for U.S. Appl. No. 17/190,268 (pp. 1-17).
Office Action dated May 18, 2021 for U.S. Appl. No. 16/692,219 (pp. 1-13).
Riza Alp Guler et al., "DensePose: Dense Human Pose Estimation in the Wild", arXiv:1802.00434v1 [cs.CV] Feb. 1, 2018, 12 pages.
Shubham Tulsiani and Jitendra Malik, "Viewpoints and Keypoints", arXiv:1411 6067v2 [cs.CV] Apr. 26, 2015, 10 pages.
Wenhao Lu, et al., "Parsing Semantic Parts of Cars Using Graphical Models and Segment Appearance Consistency", arXiv:1406.2375v2 [cs.CV] Jun. 11, 2014, 12 pages.
Extended European Search Report issued in App. No. EP20744281.5, dated Aug. 12, 2022, 7 pages.
Office Action (Final Rejection) dated Aug. 12, 2022 for U.S. Appl. No. 16/518,501 (pp. 1-21).
Office Action (Non-Final Rejection) dated Jul. 22, 2022 for U.S. Appl. No. 17/351,124 (pp. 1-12).
Office Action (Non-Final Rejection) dated Aug. 18, 2022 for U.S. Appl. No. 17/174,250 (pp. 1-17).
Office Action (Notice of Allowance and Fees Due (PTOL-85)) dated Aug. 17, 2022 for U.S. Appl. No. 16/692,219 (pp. 1-7).
Dorfler Martin et al., "Application of Surface Reconstruction for Car Undercarriage Inspection", 2020 3rd International Conference on Intelligent Robotic and Control Engineering (IRCE), IEEE, (Aug. 10, 2020), doi: 10.1109/IRCE50905.2020.9199251, pp. 47-51, XP033828019 Abstract Only.
Giegerich, et al., "Automated Classification of "Bad Images" by Means of Machine Learning for Improved Analysis of Vehicle Undercarriages," TechConnect Briefs 2022, pp. 1-4.
Green, et al., "Vehicle Underscarriage Scanning for use in Crash Reconstruction," FARO White Paper, 2015, 5 pages.
IVUS Intelligent Vehicle Undercarriage Scanner Brochusre, GatekeeperSecurity.com, 2 pages.
Kiong, Frederick Chong Chuen, "Vehicle Undercarriage Scanning System," A disseration for ENG 4111 and ENG 4112 Research Project, University of Southern Queensland (USQ), Oct. 27, 2005, 163 pages.
Office Action (Final Rejection) dated Jan. 31, 2023 for U.S. Appl. No. 17/351,124 (pp. 1-14).
Office Action (Final Rejection) dated Aug. 31, 2022 for U.S. Appl. No. 17/144,879 (pp. 1-14).
Office Action (Final Rejection) dated Nov. 14, 2022 for U.S. Appl. No. 16/861,097 (pp. 1-19).
Office Action (Final Rejection) dated Nov. 14, 2022 for U.S. Appl. No. 16/861,100 (pp. 1-19).
Office Action (Non-Final Rejection) dated Jan. 6, 2023 for U.S. Appl. No. 17/144,879 (pp. 1-14).
Office Action (Non-Final Rejection) dated Jan. 13, 2023 for U.S. Appl. No. 16/518,501 (pp. 1-21).
Office Action (Non-Final Rejection) dated Mar. 16, 2023 for U.S. Appl. No. 16/937,884 (pp. 1-30).
Office Action (Non-Final Rejection) dated Sep. 16, 2022 for U.S. Appl. No. 16/937,884 (pp. 1-29).
Office Action (Non-Final Rejection) dated Dec. 22, 2022 for U.S. Appl. No. 17/502,579 (pp. 1-20).
Office Action (Notice of Allowance and Fees Due (PTOL-85)) dated Feb. 13, 2023 for U.S. Appl. No. 17/190,268 (pp. 1-4).
Office Action (Notice of Allowance and Fees Due (PTOL-85)) dated Apr. 4, 2023 for U.S. Appl. No. 17/174,250 (pp. 1-8).

(56) References Cited

OTHER PUBLICATIONS

Office Action (Notice of Allowance and Fees Due (PTOL-85)) dated May 1, 2023 for U.S. Appl. No. 17/502,579 (pp. 1-8).
Office Action (Notice of Allowance and Fees Due (PTOL-85)) dated Sep. 19, 2022 for U.S. Appl. No. 17/144,885 (pp. 1-7).
Office Action (Notice of Allowance and Fees Due (PTOL-85)) dated Nov. 15, 2022 for U.S. Appl. No. 17/190,268 (pp. 1-7).
Office Action (Notice of Allowance and Fees Due (PTOL-85)) dated Dec. 19, 2022 for U.S. Appl. No. 17/190,268 (pp. 1-4).
Robert Ross et al, "Mobile robot mosaic imaging of vehicle undercarriages using catadioptric vision", Control, Automation and Information Sciences (ICCAIS), 2012 International Conference on, IEEE, (Nov. 26, 2012), doi: 10.1109/ICCAIS.2012.6466596, ISBN 978-1-4673-0812-0, pp. 247-252, XP032335072 Abstract Only.
S. R. Sukumar et al., "Under Vehicle Inspection with 3d Imaging", 3D Imaging for Safety and Security, Dordrecht, Springer Netherlands, (Jan. 1, 2007), vol. 35, pp. 249-278, doi:10.1007/978-1-4020-6182-0_11, ISBN 978-1-4020-6181-3, XP055518511.
Zhou, X. Q., H. K. Huang, and Shieh-Liang Lou. "Authenticity and integrity of digital mammography images." IEEE transactions on medical imaging 20.8 (2001): 784-791 (Year: 2001).

\* cited by examiner

EXTRACTION OF STANDARDIZED IMAGES FROM A SINGLE VIEW OR MULTI-VIEW CAPTURE

CROSS-REFERENCE TO RELATED APPLICATIONS

The present application claims priority under 35 U.S.C. 120 to U.S. Provisional Patent Application No. 62,795,434, titled "EXTRACTION OF STANDARDIZED IMAGES FROM A SINGLE-VIEW OR MULTI-VIEW CAPTURE", filed Jan. 22, 2019, by Holzer et al., which is hereby incorporated by reference in its entirety and for all purposes. The present application also claims priority under 35 U.S.C. 120 to U.S. Provisional Patent Application No. 62,795,427, titled "AUTOMATIC VIEW MAPPING FOR SINGLE AND MULTI-VIEW CAPTURES", filed Jan. 22, 2019, by Holzer et al., which is hereby incorporated by reference in its entirety and for all purposes. The present application also claims priority under 35 U.S.C. 120 to U.S. Provisional Patent Application No. 62,795,440, titled "AUTOMATIC OBJECT ORIENTATION ESTIMATION IN VISUAL DATA", filed Jan. 22, 2019, by Holzer et al., which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

DESCRIPTION OF RELATED ART

Visual digital media content is commonly used to analyze objects. However, images may be captured from various viewpoints, whereas performing consistent analysis across different objects and different views of the same object often involves standardized object views. For example, video or images of a product may be captured from different viewpoints, while similar products may commonly be advertised with images from one or more standard viewpoints. Nevertheless, current techniques for selecting images captured from standard viewpoints from sets of images are ineffective. Accordingly, improved techniques selecting images captured from standard viewpoints from sets of images are desired.

Overview

Provided are various techniques, mechanisms, and processes relating to the processing of visual media data. According to various embodiments, component information may be identified for each input image of an object. The component information may indicate a portion of the input image in which a particular component of the object is depicted. A viewpoint may be determined for each input image that indicates a camera pose for the input image relative to the object. A three-dimensional skeleton of the object may be determined based on the viewpoints and the component information. A multi-view panel corresponding to the designated component of the object that is navigable in three dimensions and that the portions of the input images in which the designated component of the object is depicted may be stored on a storage device.

In particular embodiments, a subset of the plurality of images may be selected in which each image is captured from a respective viewpoint that is proximate to a respective one of a plurality of designated viewpoints. Each of the input images may be mapped to a top-down view of the object. The three-dimensional skeleton of the object may be constructed based in part on the top-down view. Mapping each of the input images to a top-down view of the object may involve projecting a plurality of pixels in the input images onto the three-dimensional skeleton of the object. The multi-view panel may be generated based on target viewpoint information defined in the top-down view of the object.

In particular embodiments, the plurality of images may form a multi-view capture of the object navigable in three dimensions constructed based in part on inertial measurement unit (IMU) data collected from an IMU in a mobile phone. The object may be a vehicle, and the three-dimensional skeleton may include a door and a windshield. The respective viewpoint may include a respective distance of the camera from the object.

In particular embodiments, the respective camera pose may include a respective vertical angle identifying a respective angular height of the viewpoint relative to a 2D plane parallel to a surface on which the object is situated. Alternately, or additionally, the respective camera pose may include a respective rotational angle identifying a respective degree of rotation of the viewpoint relative to a designated fixed position of the object. Alternately, or additionally, the respective camera pose may include a respective position identifying a respective position of the viewpoint relative to a designated fixed position of the object.

These and other embodiments are described further below with reference to the figures.

BRIEF DESCRIPTION OF THE DRAWINGS

Colored Drawings

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and operations for the disclosed inventive systems, apparatus, methods and computer program products for image processing. These drawings in no way limit any changes in form and detail that may be made by one skilled in the art without departing from the spirit and scope of the disclosed implementations.

Figure 1:
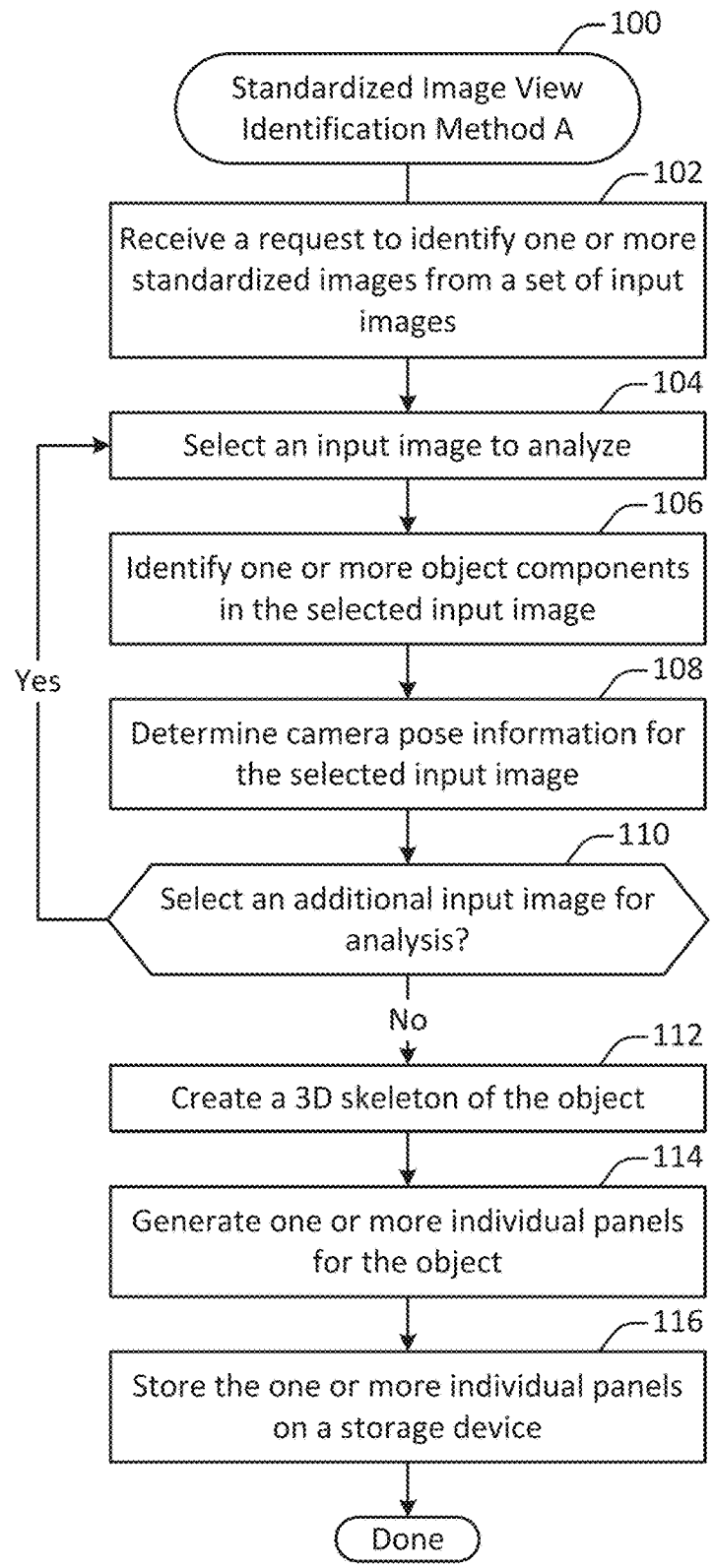

FIG. 1 illustrates a first method for standardized image view identification, performed in accordance with one or more embodiments.

Figure 2:
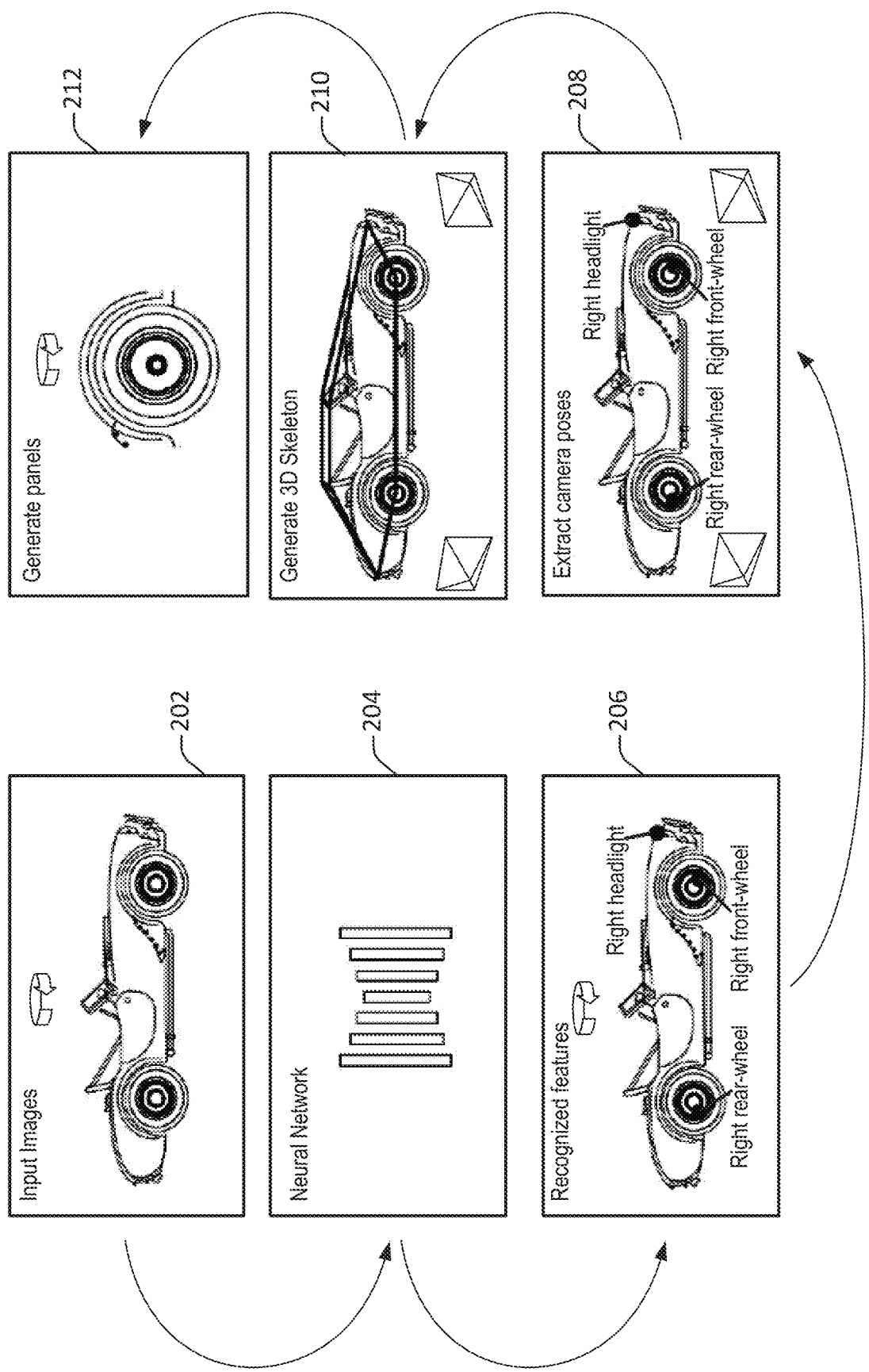

FIG. 2 illustrates an example of an object component identification procedure, performed in accordance with one or more embodiments.

Figure 3:
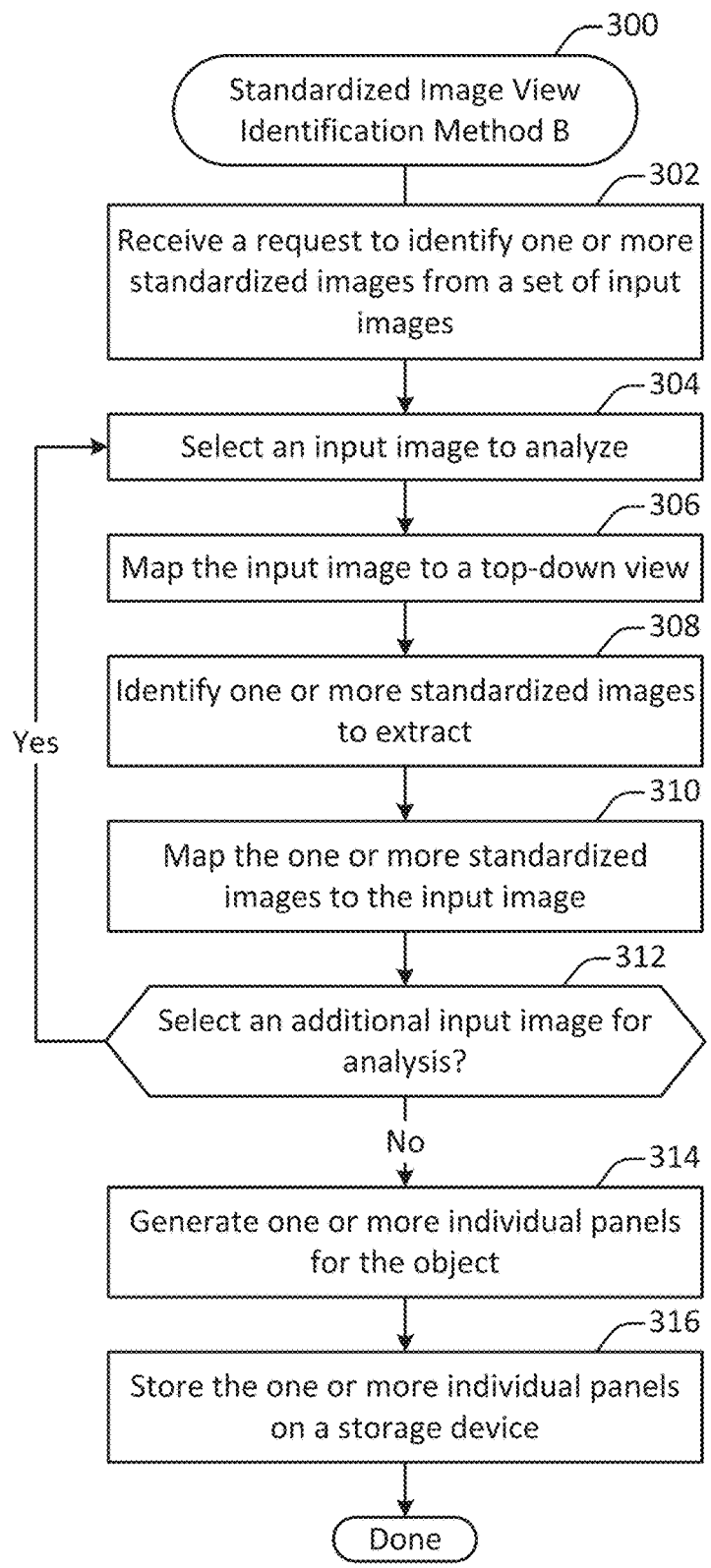

FIG. 3 illustrates a second method for standardized image view identification, performed in accordance with one or more embodiments.

Figure 4:
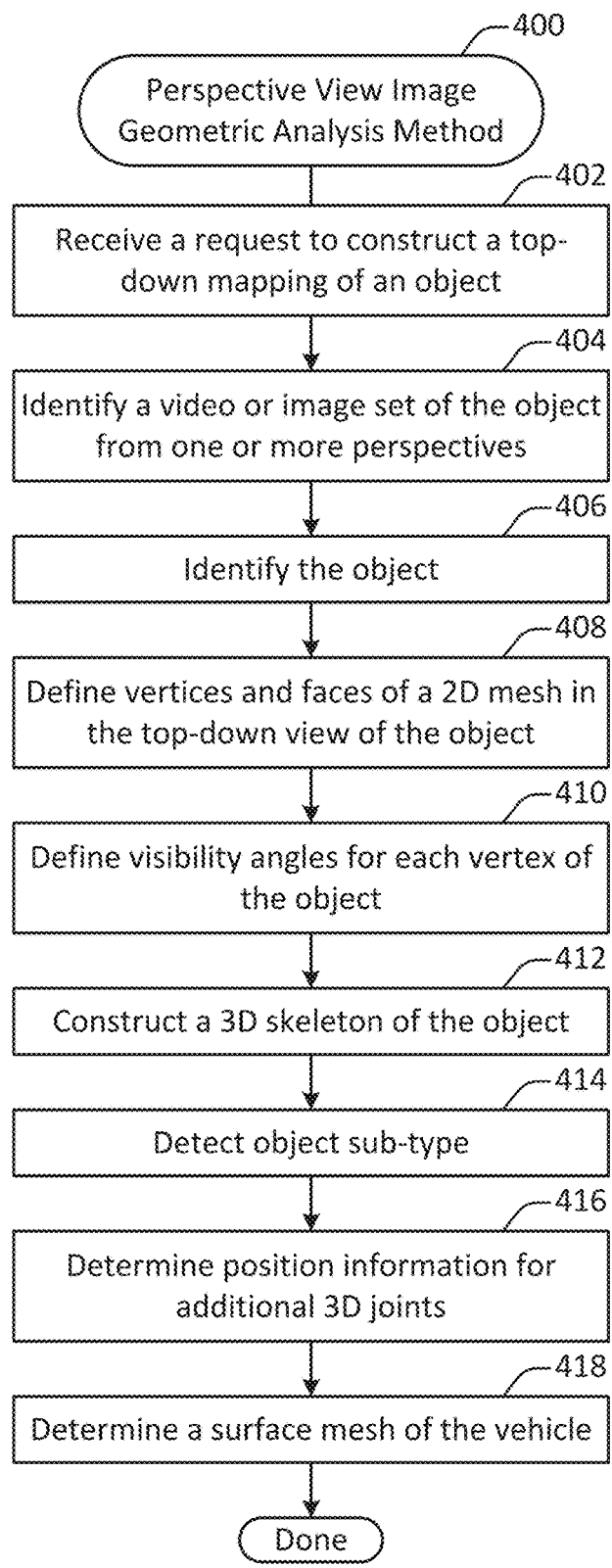

FIG. 4 illustrates one example of a method for performing geometric analysis of a perspective view image, performed in accordance with one or more embodiments.

Figure 5:
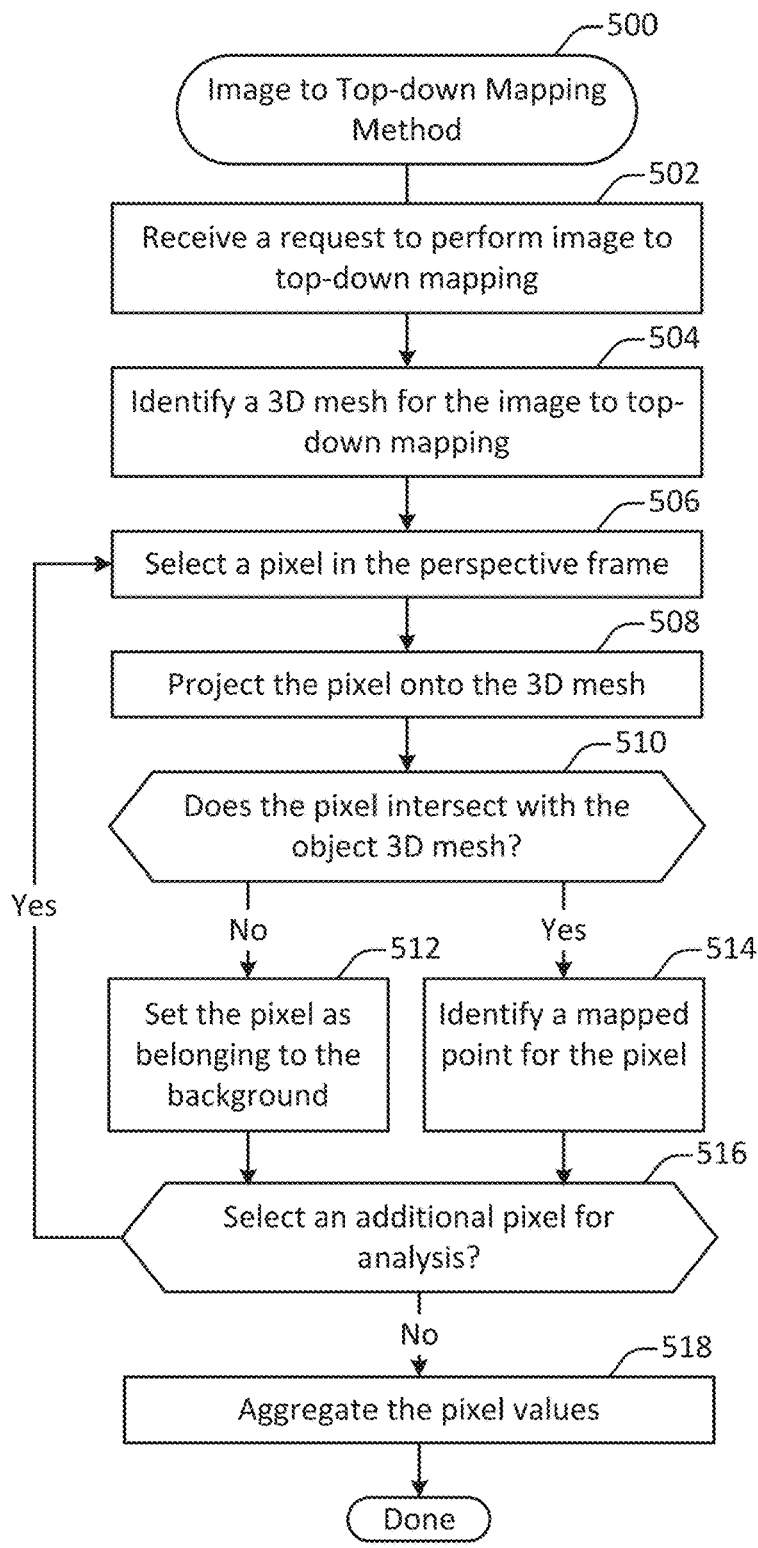

FIG. 5 illustrates one example of a method for performing perspective image to top-down view mapping, performed in accordance with one or more embodiments.

Figure 6:
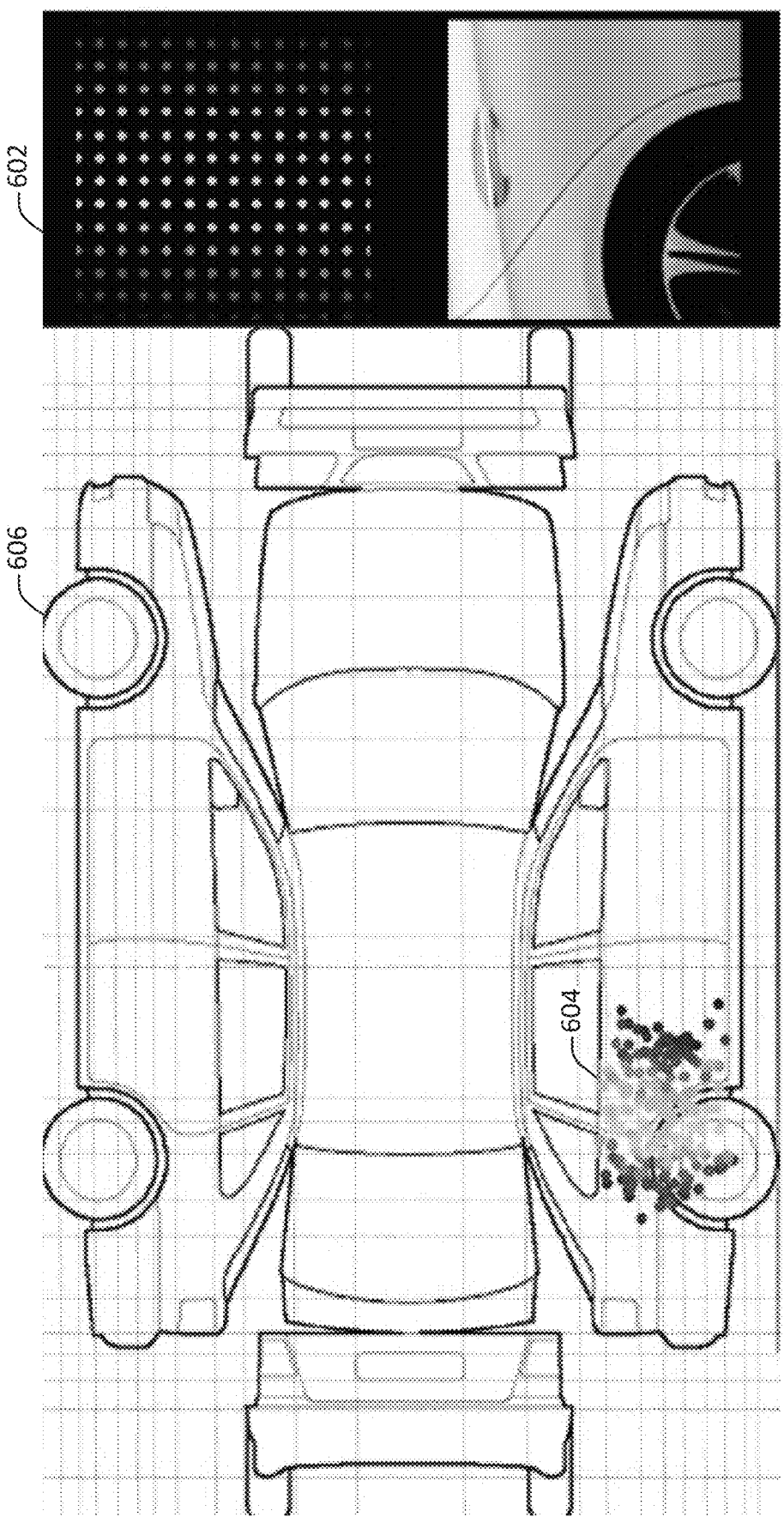

FIG. 6 illustrates an image processed in accordance with one or more embodiments.

Figure 7:
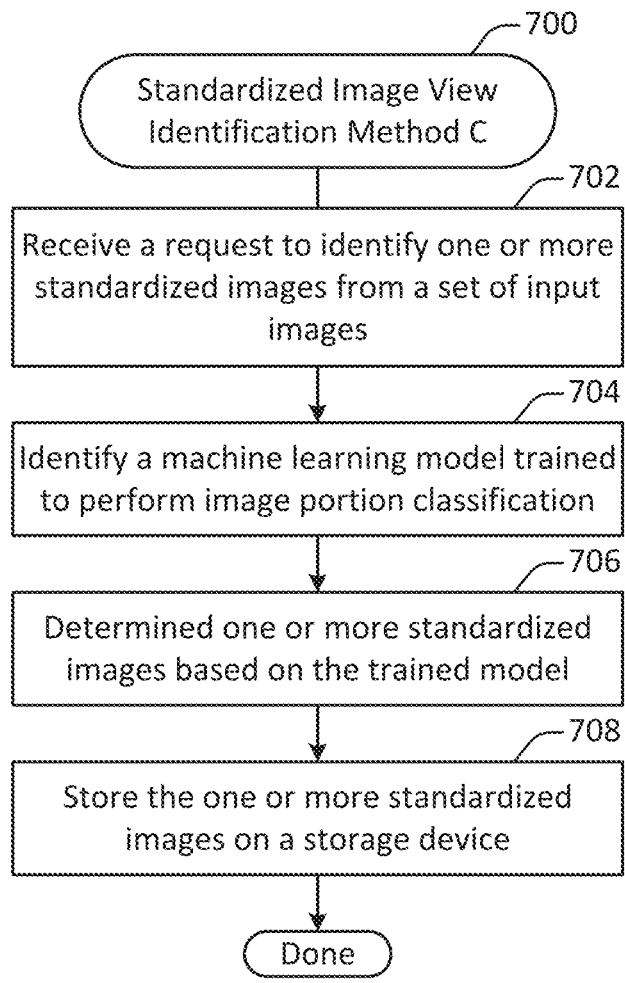

FIG. 7 illustrates a third method for standardized image view identification, performed in accordance with one or more embodiments.

Figure 8:
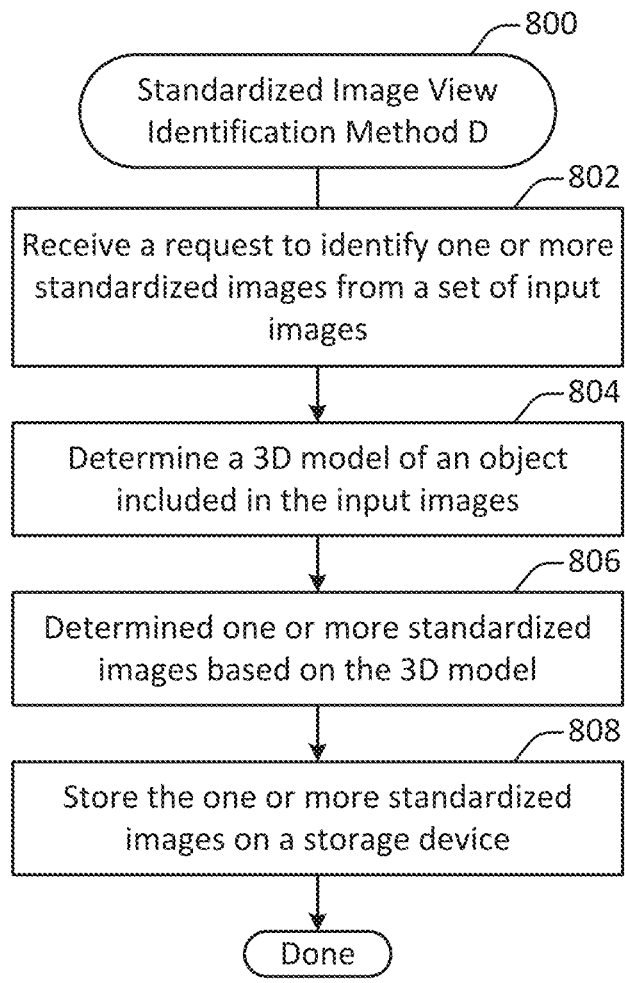

FIG. 8 illustrates a fourth method for standardized image view identification, performed in accordance with one or more embodiments.

Figure 9:
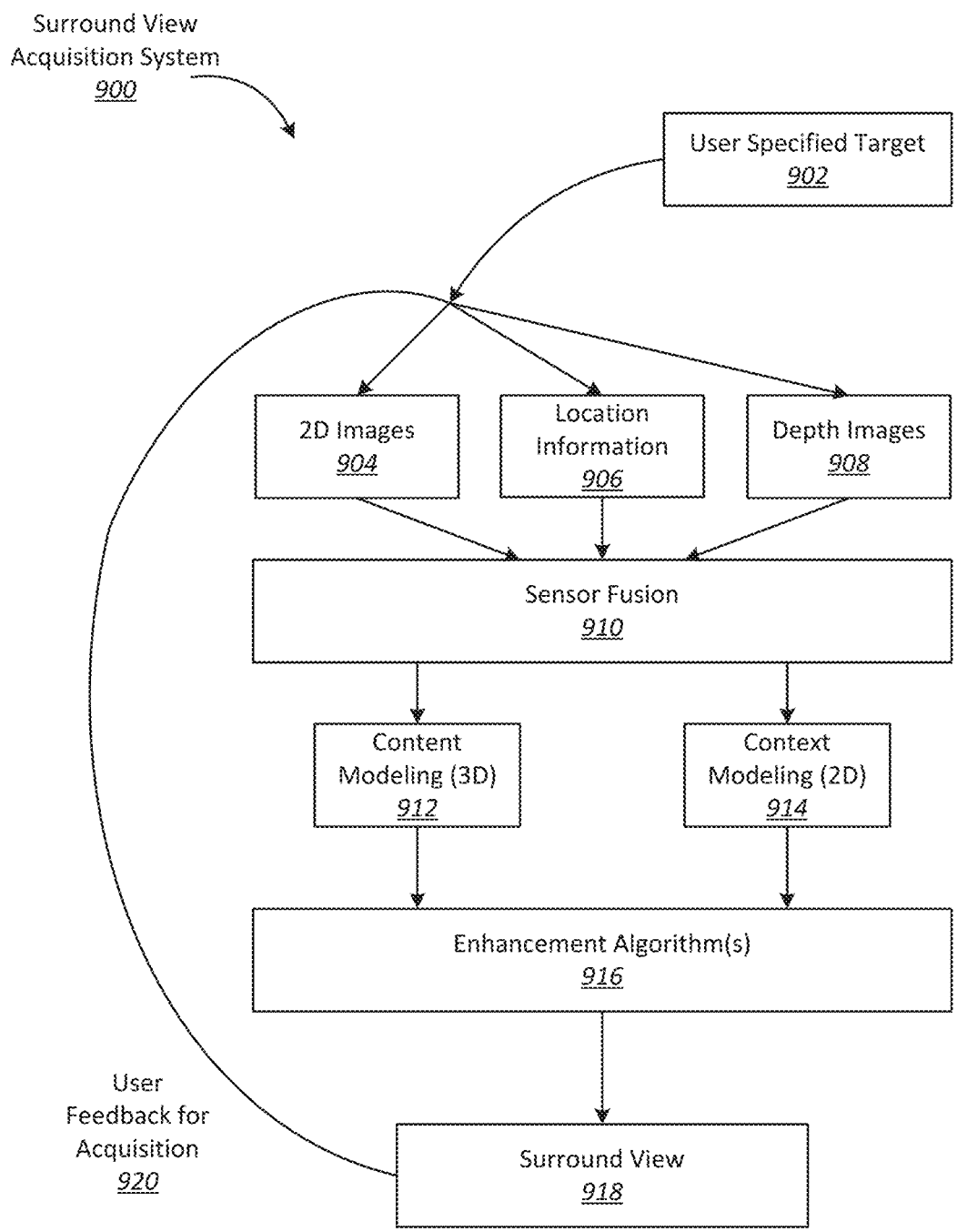

FIG. 9 illustrates an example of a surround view acquisition system configured in accordance with various embodiment.

Figure 10:
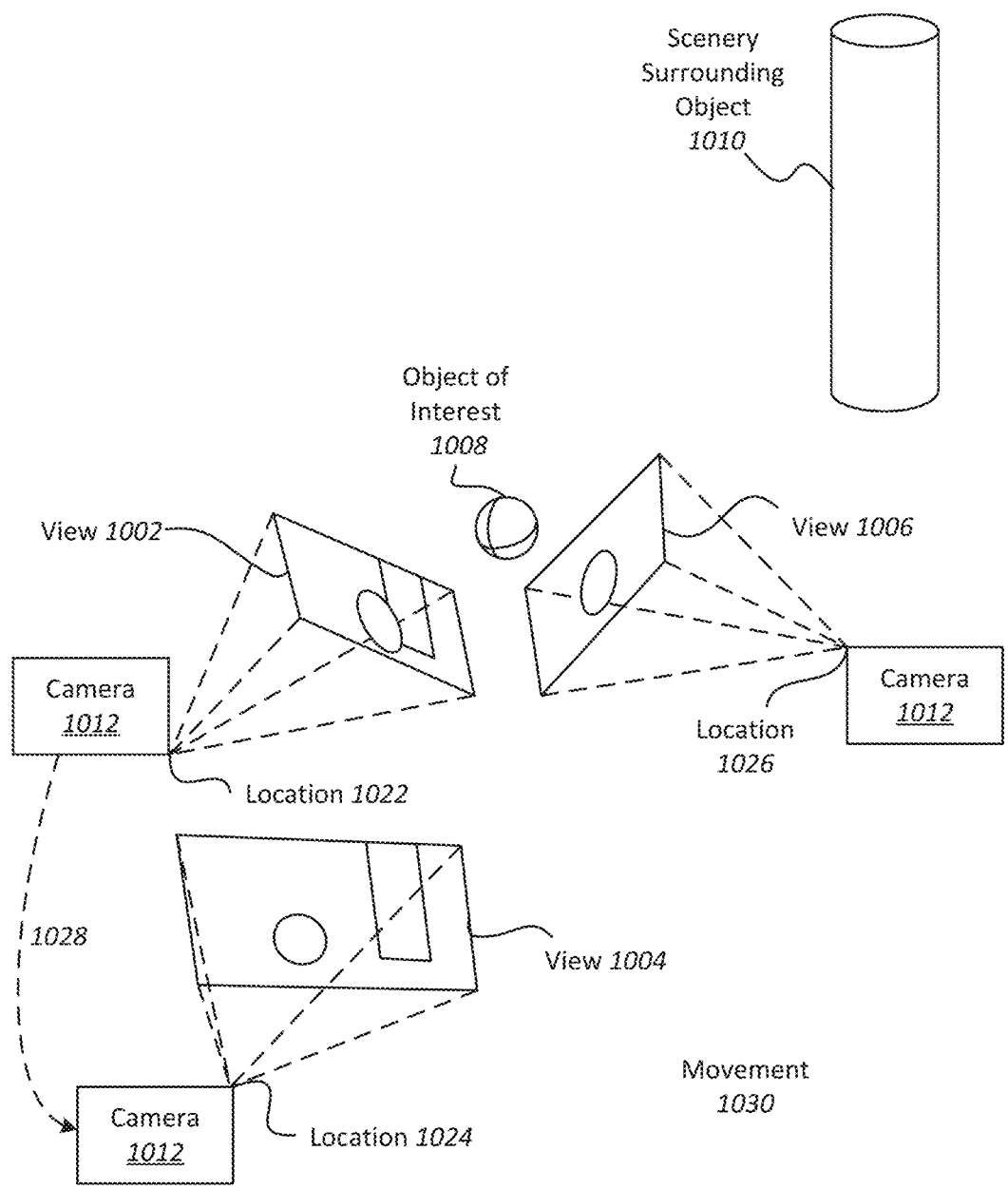

FIG. 10 illustrates an example of a device capturing multiple views of an object of interest.

Figure 11:
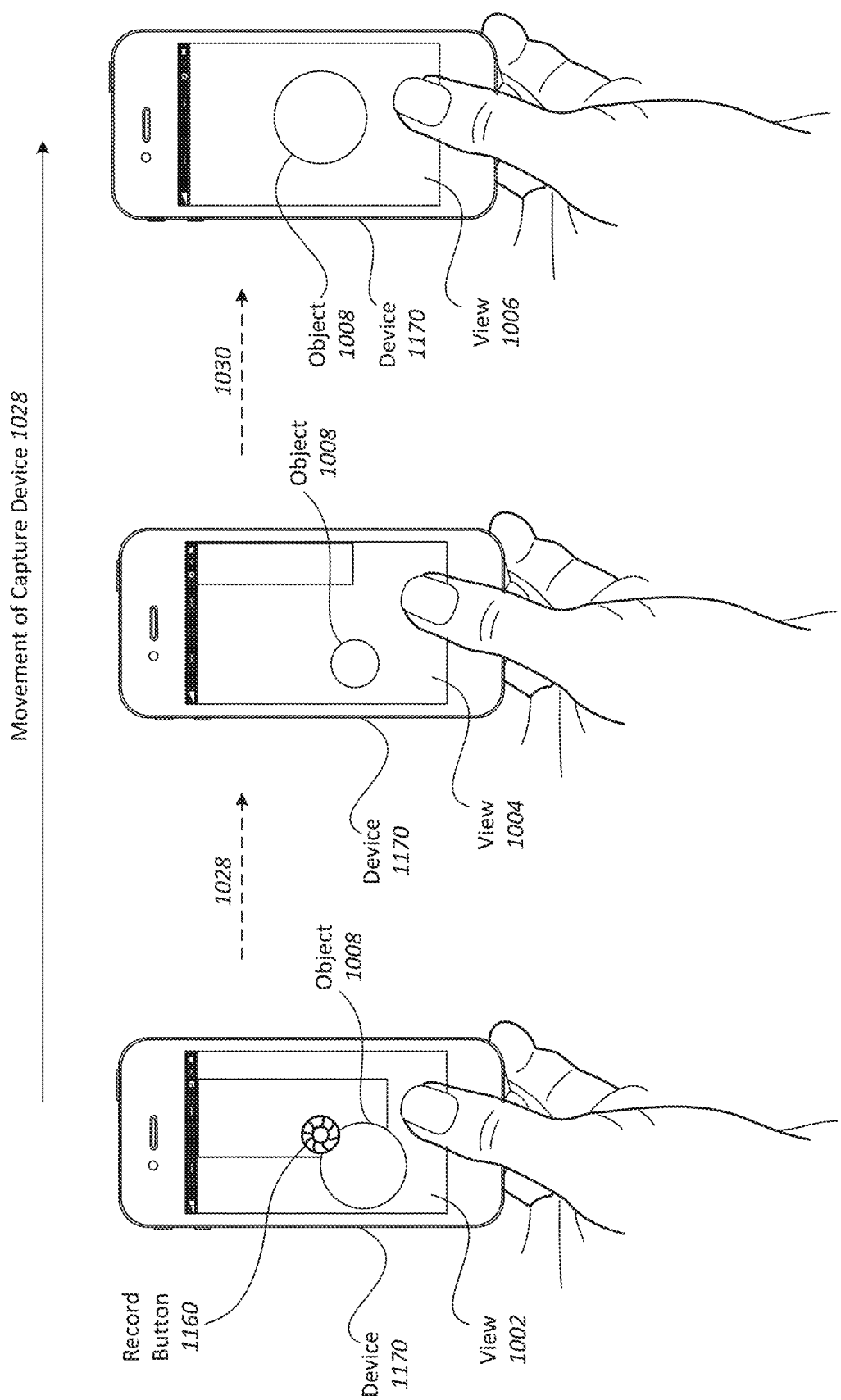

FIG. 11 illustrates an example of a device capturing views of an object of interest to create a multi-view media representation to which a filter may be applied.

Figure 12:
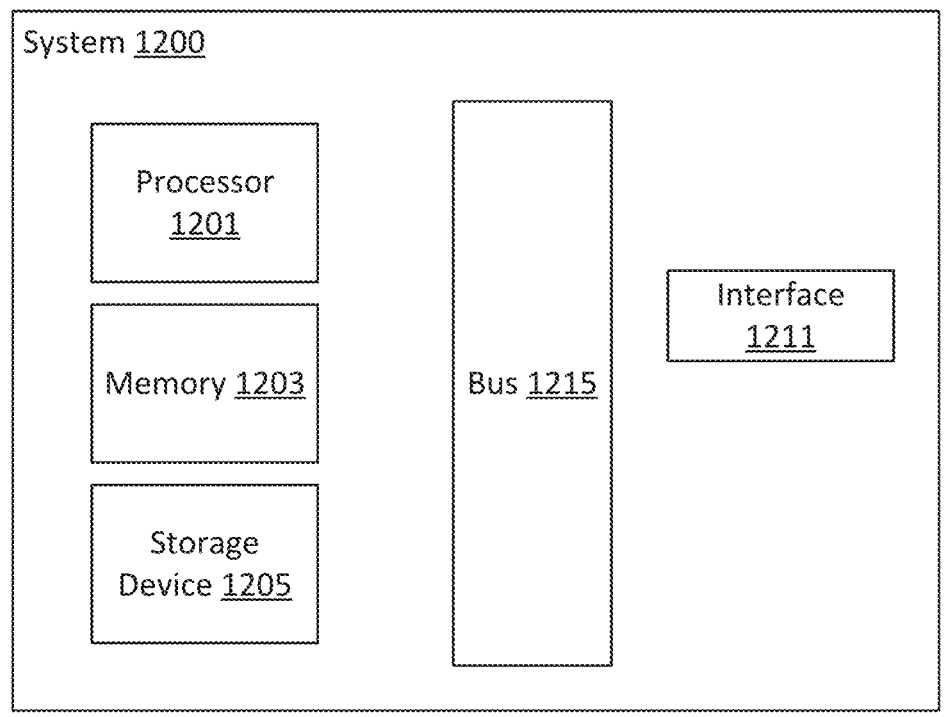

FIG. 12 illustrates a particular example of a computer system configured in accordance with various embodiment.

Figure 13:
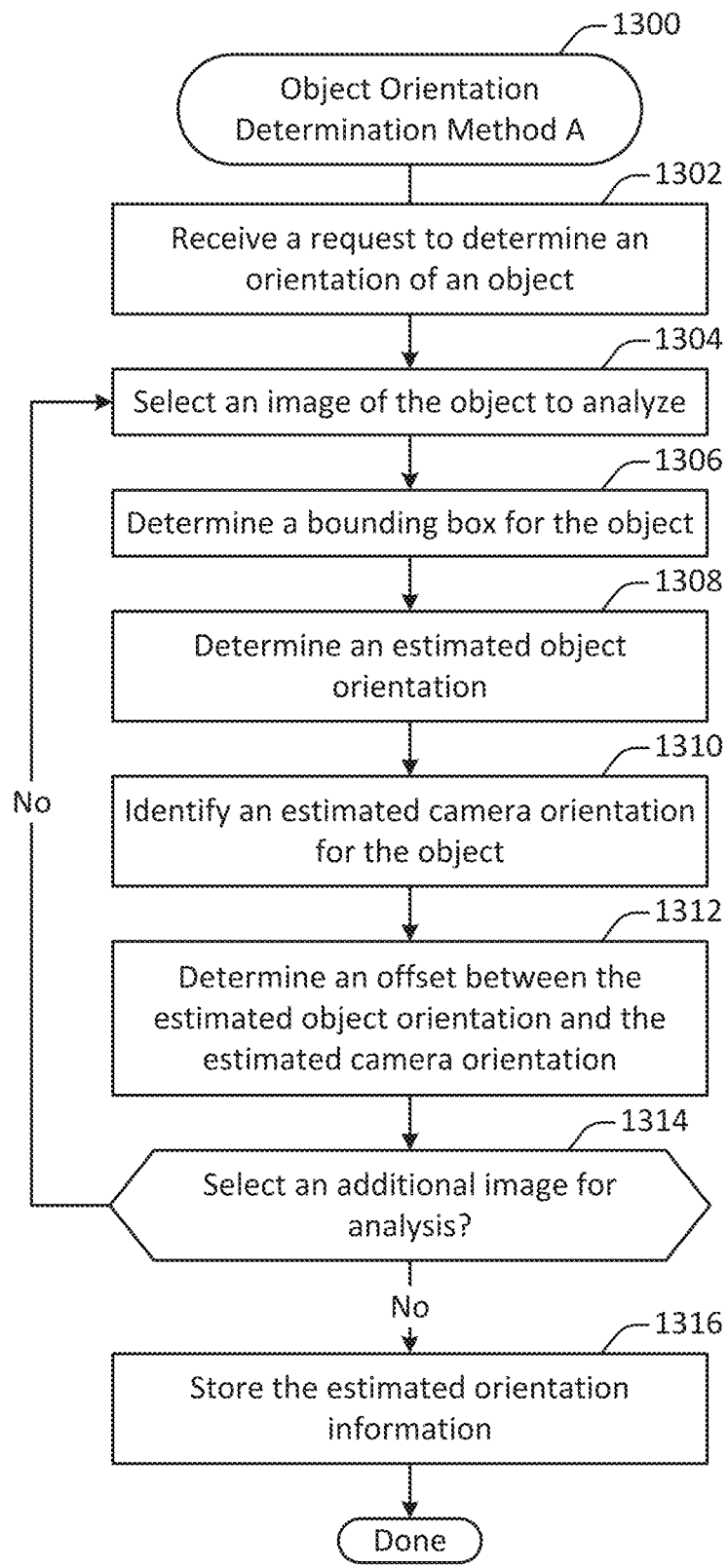

FIG. 13 illustrates a first method for determining object orientation, performed in accordance with one or more embodiments.

Figure 14:
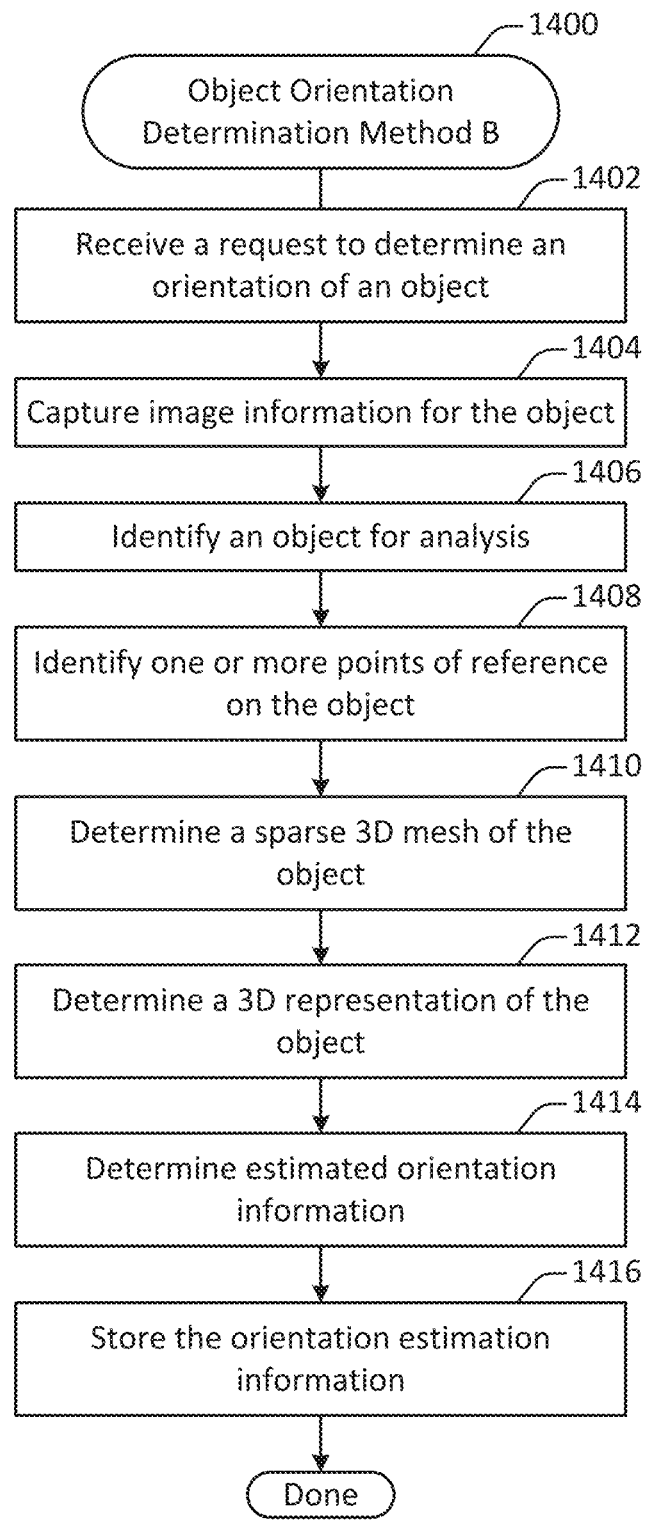

FIG. 14 illustrates a second method for determining object orientation, performed in accordance with one or more embodiments.

DETAILED DESCRIPTION

According to various embodiments, techniques and mechanisms described herein facilitate the identification of a standardized view or views from a larger set of images captured from a variety of viewing perspectives focused on an object of interest. Such techniques have a variety of applications. In some instances, the requirements for these standardized views may be based on regulations. Alternately, the requirements may be based on common practices for displaying objects. Manually extracting those standardized views from a vast set of images is a time-consuming and error-prone task. Accordingly, automated techniques for standardized image extraction are desired.

One context in which the automated generation of a standardized set of views is particularly useful is in the set of industries related to vehicles. For example, a vehicle dealer may capture a number of different images of a vehicle, and a set of standardized views may be extracted from the image set to facilitate marketing. As another example, a vehicle insurance provider may seek to generate standardized views of a vehicle for documenting the processing of insurance claims.

Another context in which the automated generation of a standardized set of views is particularly useful is in e-commerce. In many e-commerce situations, many similar versions of an object are available for purchase. Constructing a standardized set of views allows for those objects to be presented in a similar, standardized way on a website.

According to various embodiments, techniques and mechanisms described herein facilitate the extraction of a standardized subset of images from an input image set. The input image set may originate from a multi-view capture. For example, the input image set may originate from a continuous capture during a sweep around an object of interest. The sweep may include a full 360-degree set of views or may include images collected along a smaller arc.

FIG. 1 illustrates a method 100 for standardized image view identification, performed in accordance with one or more embodiments. According to various embodiments, the method 100 may be performed on a computing device such as a client machine or remote server.

At 102, a request is received to identify one or more standardized images from a set of input images. In some implementations, the input images may be captured by a conventional camera. Alternately, the input images may be captured by a camera at a mobile computing device such as a smartphone.

According to various embodiments, the set of images may be included in a multi-view capture. Additional details regarding multi-view representation construction and other features are discussed in co-pending and commonly assigned U.S. patent application Ser. No. 15/934,624, "Conversion of an Interactive Multi-view Image Data Set into a Video", by Holzer et al., filed Mar. 23, 2018, which is hereby incorporated by reference in its entirety and for all purposes.

In some embodiments, the input images may include supplementary data such as data collected from an inertial measurement unit (IMU). Such data may include measurements originating from a gyroscope and/or an accelerometer such as acceleration and/or rotational velocity data. In some embodiments, additional data such as orientation and/or location data may be determined.

An input image is selected for analysis at 104. According to various embodiments, images may be selected for analysis in sequence, in parallel, at random, or in any suitable order.

One or more object components in the selected image are identified at 106. In some implementations, an object component may be identified at least in part via a neural network. For example, the selected image may be used as an input to a neural network, which was trained on domain-specific data and identifies points on each image that locate salient parts of the images. When used on vehicles for example, the network may be trained to recognize wheels, lights, and parts of the frame.

According to various embodiments, the identification of object components may yield one or more annotated images. In an annotated image, identified components may be mapped to 2D coordinates and/or frame numbers within the image-set.

An example of an object component identification procedure is shown in FIG. 2. An input image at 202 is provided as input to a neural network 204, which results in an annotated image with identified components at 206.

Camera pose information for the selected input image is determined at 108. According to various embodiments, the camera poses may be extracted using a computer vision algorithm. Additional details regarding pose detection, which is also referred to herein as object orientation detection, are discussed with respect to FIGS. 13 and 14. As used herein, the term camera pose may refer to the viewpoint or viewing angle of the camera relative to the object captured in the image.

According to various embodiments, camera pose information may be estimated for a viewpoint in order to associate each image in a sequence of images with a viewpoint. Camera-poses may be estimated by an algorithm that uses the images and, optionally, additional information received from the capturing device. Such information may include angle, location, acceleration, velocity, drift correction, or other such data collected or determined based on information from a gyroscope, an accelerometer, magnetometer, or other such sensor associated with the camera. Such input data may be used to facilitate the determination of camera pose information using a bundle adjustment procedure. The estimated poses provide information about the relative position of the camera towards the object of interest.

An example of camera pose detection is shown at 208. Based on information such as the location of the image components (e.g., the right rear wheel, the right front wheel, and the right headline), the system may determine that the image was captured from a designated location on the right side of the vehicle.

A determination is made at 110 as to whether to select an additional input image for analysis. According to various embodiments, images may continue to be selected for analysis until all images have been analyzed. Alternately, images may continue to be selected until each of a designated set of standardized images have been selected.

A 3D skeleton of the object is created at 112. According to various embodiments, creating a 3D skeleton may involve using the location of the components in the image set identified at 106 along with the camera pose information determined at 106. The skeleton computed in 3D space may be projected to the frames of the image-set by using the inferred 3D positions and camera poses. Additional details regarding skeleton detection and other features are discussed in co-pending and commonly assigned U.S. patent application Ser. No. 15/427,026, titled "Skeleton Detection and Tracking via Client-server Communication" by Holzer et al, filed Feb. 7, 2017, which is hereby incorporated by reference in its entirety and for all purposes.

One or more individual panels for the object are generated at 114. In some implementations, based on information such as on the three-dimensional skeleton and the camera poses, the system may generate a set of standardized images using a domain-specific rule set. The domain-specific rule set may designate one or more viewpoints.

In some embodiments, the domain-specific rule set may also designate a region crop associated with a viewpoint. The region crop may identify a portion of a component to include in a standardized image associated with the viewpoint.

According to various embodiments, each individual panel may include one or more views of the object or parts of the object. A panel may include an entire image selected from the set of input images. Alternately, the panel may include a cropped portion of one or more images.

An example rule for generating a panel of a front wheel of a vehicle may be defined as follows. In the following pseudocode, the front wheel positioned is determined by first identifying images with a suitable top-down viewing angle. Then, the wheel position is identified, and the crop area determined based on the wheel location in the image and the distance between the front and back wheel. An example of an application of such a rule is shown at 212 in FIG. 2. In image at 212 shows a standardized view of the front wheel.

RULE generate_front_wheel_panel:
        FORALL poses WITH top_down_angle BETWEEN (60°,120°):
            img=GET_IMAGE_OF_POSE(pose)
            p=GET_WHEEL_POSITION_ON_POSE(pose)
            cx=0.3*HDISTANCE(pose,FRONT_WHEEL,BACK_WHEEL)
            cy=0.4*VDISTANCE(pose,FRONT_WHEEL,FRONT_ROOF)
            ADD_TO_PANEL(CROP(img,p,cx,cy))

In particular embodiments, a number of standardized views of a single component may be combined to create a localized multi-view of that component. For example, standardized views of the front wheel shown at 212 may be captured from different viewpoints, and these different standardized viewpoints may be combined to create a multi-view of the wheel.

In some implementations, a machine learning algorithm may be trained to detect a bounding box around a component of an object (e.g., a part or panel of a vehicle) that is to be represented via a standardized image. After estimating the bounding box for a specific component in an input image or in a multi-view representation, the area within the bounding box may be extracted and presented as a result. In particular embodiments, such techniques may be applied to object interiors as well as object exteriors.

The one or more individual panels are stored on a storage device at 116. According to various embodiments, the panels may be stored as a newly created image-set. Alternately, or additionally, the panels may be stored as an image-sequence, which may be subject to video playback. In some implementations, the one or more individual panels may be transmitted to a remote location via a network, such as to a remote server or to a client machine.

According to various embodiments, the operations performed in FIG. 1 or in other methods described herein may be used to extract standardized views from a video. For example, a 360-degree view of a vehicle may be used as input to extract views of the vehicle at 45-degree angles around the vehicle. In such a configuration, a crop of the image may contain the entire object. The bounding box of the object inside the image may be obtained at least in part with a neural network for object detection. Alternately, the bounding box of the object inside the image may be obtained at least in part directly from the 3D skeleton determined at 112, which may be re-projected onto one or more frames.

According to various embodiments, one or more of the operations shown in FIG. 1 or in other methods described herein may be performed in an order different than that shown. For example, camera pose information may be determined at 108 before, after, or in parallel to the identification of the one or more object components at 106.

The method 100 and other methods described herein are described as involving the estimation of a 3D skeleton of an object. However, according to various embodiments, a 2D skeleton may be estimated from an input image or from each viewpoint of a multi-view representation. Then, the areas to extract may be defined relative to the joint locations of the skeleton. The joint locations may be treated as salient key-points that a machine learning algorithm is trained to detect.

According to various embodiments, as is described in additional detail with respect to FIG. 3, the method 100 shown in FIG. 1 and other methods described herein may be applied to capture viewpoints from the interior of an object.

In particular embodiments, when the input data includes a multi-view representation, points near the locations that are to be extracted may be tracked across images. Such point tracking may facilitate the smoothing of the location of the area to extract and/or the construction of a multi-view crop that is more stable than would otherwise be the case.

FIG. 3 illustrates a method 300 for standardized image view identification, performed in accordance with one or more embodiments. According to various embodiments, the method 300 may be performed on a computing device such as a client machine or remote server.

At 302, a request is received to identify one or more standardized images from a set of input images. In some implementations, the set of images may be included in a multi-view capture. In some implementations, the input images may be captured by a conventional camera. Alternately, the input images may be captured by a smartphone camera.

In some embodiments, the input images may include supplementary data such as data collected from an inertial measurement unit (IMU). Such data may include measurements originating from a gyroscope and/or an accelerometer such as orientation, location, and/or acceleration information.

An input image is selected for analysis at 304. According to various embodiments, images may be selected for analysis in sequence, in parallel, at random, or in any suitable order.

At 306, the input image is mapped to a top-down view. Techniques and mechanisms that may be used to facilitate top-down view mapping are discussed in additional detail with respect to FIGS. 4, 5, and 6.

At 308, one or more standardized images to extract are identified. In some implementations, a mapping of the top-down view to the input image provides a way to determine the corresponding image location for each location in the top-down view. Therefore, a standardized image or multi-view crop can be defined in the top-down view. For example, the panels or image locations of a vehicle may be defined in such a top-down view.

In some implementations, instead of defining the desired perspectives in a top-down view, the system can employ an example of the designated perspectives for an instance of the object. For example, desired image crops may be specified for a specific vehicle. The top-down mapping network can then map these examples to the top-down view. In this way, the same crops may be generated for other object instances as described herein. Alternately, a per-pixel classification may be run on the image to identify a part of the object that is visible.

In case of a multi-view capture, the mapping may be computed for every viewpoint of the multi-view representation. In some configurations, points near the locations that are to be extracted may be tracked for use in smoothing the location of the area to extract. Such an approach may result in a multi-view crop that is more stable.

Although techniques and mechanisms described herein such as top-down view mapping are described with respect to the exterior of an object, similar techniques may be applied to interior views of an object such as a vehicle. According to various embodiments, various types of input formats may be used for the interior of an object. For example, a single image may be taken using a regular camera. As another example, a photo sphere (i.e. a 360-degree image) may be taken using a 360 camera or stitched together from multiple single images, or a multi-view representation. If an object interior is used as an input, then the trained mapping may map points from the input image data to a common representation for interiors of the object type captured, similar to a top-down view of a vehicle exterior.

A determination is made at 312 as to whether to select an additional input image for analysis. According to various embodiments, images may continue to be selected for analysis until all images have been analyzed. Alternately, images may continue to be selected until each of a designated set of standardized images have been selected.

One or more individual panels for the object are generated at 314. In some implementations, based information such as on the three-dimensional map and the camera poses, the system may generate a set of standardized images using a domain-specific rule set. The domain-specific rule set may designate one or more viewpoints.

In some embodiments, there may be a selection of the best image from which to extract a crop as a defined crop region might be visible in multiple images, but only a single crop is to be supplied as a result. An example for such a selection method can be to select the image for which the cropped area fills the most area (in pixels) or where the corresponding 3D part faces the camera the most. In some embodiments, the resulting extracted crops may be multi-view representations.

The one or more individual panels are stored on a storage device at 316. According to various embodiments, the panels may be stored as a newly created image-set. Alternately, or additionally, the panels may be stored as an image-sequence, which may be subject to video playback. In some implementations, the one or more individual panels may be transmitted to a remote location via a network, such as to a remote server or to a client machine.

According to various embodiments, the operations performed in FIG. 3 may be used to extract standardized views from a video. For example, a 360-degree view of a vehicle may be used as input to extract views of the vehicle at 45-degree angles around the vehicle.

FIG. 4 illustrates one example of a method 400 for performing geometric analysis of a perspective view image, performed in accordance with one or more embodiments. The method 400 may be performed on any suitable computing device. For example, the method 400 may be performed on a mobile computing device such as a smartphone. Alternately, or additionally, the method 400 may be performed on a remote server in communication with a mobile computing device.

A request to construct a top-down mapping of an object is received at 402. The request may be generated as part of a procedure to identify one or more standard object views.

At 404, a video or image set of the object captured from one or more perspectives is identified. The video or image set is referred to herein as "source data". According to various embodiments, the source data may include a 360-degree view of the object. Alternately, the source data may include a view that has less than 360-degree coverage.

In some embodiments, the source data may include data captured from a camera. For example, the camera may be located on a mobile computing device such a mobile phone. As another example, one or more traditional cameras may be used to capture such information.

In some implementations, the source data may include data collected from an inertial measurement unit (IMU). IMU data may include information acceleration data and/or angular velocity data. Alternately, or additionally, sensor data such as camera location, camera angle, device velocity, or any of a wide variety of data may be collected.

The object is identified at 406. In some implementations, the object may be identified based on user input. For example, a user may identify the object as a vehicle or person via a user interface component such as a drop-down menu.

In some embodiments, the object may be identified based on image recognition. For example, the source data may be analyzed to determine that the subject of the source data is a vehicle, a person, or another such object. The source data may include a variety of image data. However, in case of a multi-view capture the source data focuses in a particular object from different viewpoints, the image recognition procedure may identify commonalities between the different perspective views to isolate the object that is the subject of the source data from other objects that are present in some portion of the source data but not in other portions of the source data.

At 408, vertices and faces of a 2D mesh are defined in the top-down view of the object. According to various embodiments, each face may represent a part of the object surface that could be approximated as being planar. For example, when a vehicle is captured in the source data, the vehicle's door panel or roof may be represented as a face in a 2D mesh because the door and roof are approximately planar despite being slightly curved.

In some embodiments, vertices and faces of a 2D mesh may be identified by analyzing the source data. Alternately, or additionally, the identification of the object at 406 may allow for the retrieval of a predetermined 2D mesh. For example, a vehicle object may be associated with a default 2D mesh that may be retrieved upon request.

Visibility angles are determined for each vertex of the object at 410. According to various embodiments, a visibility angle indicates the range of object angles with respect to the camera for which the vertex is visible. In some embodiments, visibility angles of a 2D mesh may be identified by analyzing the source data. Alternately, or additionally, the identification of the object at 406 may allow for the retrieval of predetermined visibility angle along with a predetermined 2D mesh. For example, a vehicle object may be associated with a default 2D mesh with associated visibility angle that may be retrieved upon request. In particular embodiments, visibility angles may be used to extract standardized images. For example, once the object orientation is estimated, the viewpoints may be selected that best fit the angles that match the designated standardized image viewpoints.

A 3D skeleton of the object is constructed at 4:12. According to various embodiments, constructing a 3D skeleton may involve any of a variety of operations.

For example, a neural network may detect a 2D skeleton based on a 2D image. The detected 2D skeleton may then be combined with other 2D skeletons detected from other images, and/or camera pose information. Camera pose information may identify the spatial relationship between the camera and an object in a perspective view of the object. For example, the camera pose information may include 3D camera orientation information identifying a rotational relationship of the camera to the object. Alternatively, or additionally, the camera pose information may include 3D translation information identifying a camera position relative to the object. Thus, camera pose information may include multiple (e.g., six) degrees of freedom. A 3D skeleton may be identified based on a combination of the camera pose information and the 2D skeleton from one or more perspective view images.

In some implementations, a 3D surface mesh model of an object may be available. For example, such a mesh model may be computed through segmentation and space carving or through other 3D reconstruction methods. A 3D surface mesh model may more precisely follow the surface of an actual object than the 3D skeleton mesh model. Accordingly, the mapping procedure may identify the nearest surface mesh points to the skeleton joints and then define a mapping from the skeleton mesh to the surface mesh (or vice versa) using those skeleton joints to surface mesh correspondences. This mapping may be used to facilitate improved point or pixel mapping.

An object sub-type is detected at 414. In some embodiments, an object sub-type may be a refinement of the object identification performed at 406 based on the additional information defined and determined at operations 408-412. For example, a vehicle object type may be refined to reflect a body type such as a sedan, a sports utility vehicle, or a pickup truck.

According to various embodiments, an object sub-type may be identified in any of various ways. For example, an object sub-type may be automatically detected from the 3D skeleton. As another example, an object sub-type may be identified based on user input. As another example, an object sub-type may be identified based on a machine learning algorithm, which may be applied to the original source data and/or to refines of the source data such as the 3D skeleton.

If necessary, position information for additional 3D joints is determined at 416. According to various embodiments, the position of additional 3D joints may be inferred from the existing 3D skeleton. For example, a 3D skeleton of a vehicle may reveal that the vehicle has four wheels, even if a wheel is not visible in the source data. In this way, the final 3D skeleton may be expanded to include all of the vertices of the mesh defined in the top-down image.

In some implementations, the inference of additional 3D joints may depend on the object sub-type. For example, a pickup truck may have different 3D joints than a sedan or sports utility vehicle.

A surface mesh of the vehicle is determined at 418. According to various embodiments, the surface mesh may be determined by using the 3D skeleton joints as vertices of the mesh. For example, each face of the mesh may approximate the object shape with a planar surface.

FIG. 5 illustrates one example of a method 500 for performing perspective image to top-down view mapping, performed in accordance with one or more embodiments. In some embodiments, the method 500 may be performed to map each pixel of an object represented in a perspective view to the corresponding point in a predefined top-down view of that class of objects.

The method 500 may be performed on any suitable computing device. For example, the method 500 may be performed on a mobile computing device such as a smartphone. Alternately, or additionally, the method 500 may be performed on a remote server in communication with a mobile computing device.

A request to construct a top-down mapping of an object is received at 502. According to various embodiments, the request may be generated after the performance of geometric analysis as discussed with respect to the method 400 shown in FIG. 4. The request may identify one or more images for which to perform the top-down mapping. For example, the images used to perform the geometric analysis discussed with respect to FIG. 1 may be used for image to top-down mapping.

A 3D mesh for the image to top-down mapping is identified at 504. The 3D mesh may be constructed as discussed with respect to the method 400 shown in FIG. 4. The 3D mesh may provide a three-dimensional representation of the object and serve as an intervening representation between the actual perspective view image and the top-down view.

At 506, a pixel in the perspective frame is selected for analysis. According to various embodiments, pixels may be selected in any suitable order. For example, pixels may be selected sequentially. As another example, pixels may be selected based on characteristics such as location or color. Such a selection process may facilitate faster analysis by focusing the analysis on portions of the image most likely to be present in the 3D mesh.

The pixel is projected onto the 3D mesh at 508. In some implementations, projecting the pixel onto the 3D mesh may involve simulating a camera ray passing by the pixel position in the image plan and into the 3D mesh. Upon simulating such a camera ray, barycentric coordinates of the intersection point with respect to the vertices of the intersection face may be extracted.

A determination is made at 510 as to whether the pixel intersects with the object 3D mesh. If the pixel does not intersect with the object 3D mesh, then at 512 the pixel is set as belonging to the background. If instead the pixel does intersect with the object 3D mesh, then at 514 a mapped point is identified for the pixel. According to various embodiments, a mapped point may be identified by applying the barycentric coordinates as weights for the vertices of the corresponding intersection face in the top-down image.

In some embodiments, a machine learning approach may be used to perform image to top-down mapping on a single image. For example, a machine learning algorithm may be run on the perspective image as a whole. The machine learning algorithm may identify 2D locations of each pixel (or a subset of them) in the top-down image.

In some implementations, a machine learning approach may be used to perform top-down to image mapping. For example, given a perspective image and a point of interest in the top-down image, the machine learning algorithm may be run on the perspective image for identifying the top-down locations of its points. Then, the point of interest in the top-down image may be mapped to the perspective image.

In some embodiments, mapping the point of interest in the top-down image to the perspective image may involve first selecting the points in the perspective image whose top-down mapping is closest to the interest point. Then, the selected points in the perspective image may be interpolated.

Examples of an image to top-down mapping are shown in FIG. 6. The locations of pixels in images of vehicle components are represented by colored dots. These dot locations are mapped from fixed locations 602 in the perspective view to corresponding locations 605 on the top-down view 606.

Returning to FIG. 5, as an alternative to operations 506-510, the projections of the 3D skeleton joints faces may be used together with the corresponding joints and faces in the top-down view to directly define image transformations that map pixel information from the perspective views into the top-down view and vice versa.

A determination is made at 516 as to whether to select an additional pixel for analysis. According to various embodiments, analysis may continue until all pixels or a suitable number of pixels are mapped. As discussed with respect to operation 506, pixels may be analyzed in sequence, in parallel, or in any suitable order.

Optionally, the computed pixel values are aggregated at 518. According to various embodiments, aggregating the computing pixel values may involve, for example, storing a cohesive pixel map on a storage device or memory module.

FIG. 7 illustrates a method 700 for standardized image view identification, performed in accordance with one or more embodiments. According to various embodiments, the method 700 may be performed on a computing device such as a client machine or remote server.

At 702, a request is received to identify one or more standardized images from a set of input images. In some implementations, the set of images may be included in a multi-view capture. In some implementations, the input images may be captured by a conventional camera. Alternately, the input images may be captured by a smartphone camera. In some embodiments, the input images may include supplementary data such as data collected from an inertial measurement unit (IMU). Such data may include measurements originating from a gyroscope and/or an accelerometer such as acceleration and/or angular velocity information.

At 704, a machine learning model trained to perform image portion classification is identified. At 706, one or more standardized images are determined based on the trained model. According to various embodiments, various types of machine learning models may be used.

In some implementations, a machine learning algorithm may be trained to directly output a designated cropped region from a designated input image. Such an approach may be applied on a single image or on different viewpoints of a multi-view representation.

In some implementations, a machine learning algorithm may be trained to label one or more of pixels of an input image or of a multi-view representation as a component of an object such as a vehicle. For example, each pixel in an input image may be independently classified. Then, different pixels with the same label may be clustered together and used to extract the image data covered by those pixels as a desired crop. In particular embodiments, such techniques may be applied to object interiors as well as object exteriors.

In some implementations, a machine learning algorithm may be employed to identify features of an object. By identifying features of an object, semantic information may be associated with positions on the individual images. In conjunction with the camera poses, this semantic information facilitates the extraction of a three-dimensional map of the object where the relevant parts have been identified.

The one or more individual panels are stored on a storage device at 708. According to various embodiments, the panels may be stored as a newly-created image-set. Alternately, or additionally, the panels may be stored as an image-sequence which may be subject to video playback. In some implementations, the one or more individual panels may be transmitted to a remote location via a network, such as to a remote server or to a client machine.

FIG. 8 illustrates a method 800 for standardized image view identification, performed in accordance with one or more embodiments. According to various embodiments, the method 800 may be performed on a computing device such as a client machine or remote server.

At 802, a request is received to identify one or more standardized images from a set of input images. In some implementations, the set of images may be included in a multi-view capture. In some implementations, the input images may be captured by a conventional camera. Alternately, the input images may be captured by a smartphone camera.

In some embodiments, the input images may include supplementary data such as data collected from an inertial measurement unit (IMU). Such data may include measurements originating from a gyroscope and/or an accelerometer such as acceleration and/or angular velocity data.

At 804, a 3D model of an object included in the input images is determined. At 806, one or more standardized images are determined based on the 3D model. According to various embodiments, various 3D model approaches may be used.

In some implementations, the construction of a 3D model may involve computing one or more segmentation masks, estimating one or more 3D poses, and/or performing space carving. The mesh may be refined using an image-based mesh refinement. Then, a machine learning algorithm may be used to classify the different parts of the 3D model as specific object components (e.g., vehicle parts). The object component classifications may then be projected back into the original viewpoint images. Standardized image views may then be determined as discussed, for example, with respect to FIG. 1.

In particular embodiments, a 3D model of the object may be matched with a reference 3D model of an object. The specification of the crop areas may be done with respect to the reference 3D model. That specification may then be propagated onto the 3D model reconstruction obtained from the visual data of the multi-view representation. The propagated information may be back-projected into the original image data from the locations where the crop regions were extracted.

In some implementations, matching between an estimated 3D model and a reference 3D model may involve first estimating the orientation of the 3D model. Orientation estimation may add a strong constraint on the possible matching between the two 3D models.

The one or more individual panels are stored on a storage device at 808. According to various embodiments, the panels may be stored as a newly-created image-set. Alternately, or additionally, the panels may be stored as an image-sequence which may be subject to video playback. In some implementations, the one or more individual panels may be transmitted to a remote location via a network, such as to a remote server or to a client machine.

With reference to FIG. 9, shown is an example of a surround view acquisition system that can be used to generate a multi-view interactive digital media representation that can be used for the application of filters or visual effects. A multi-view interactive digital media representation includes much more information than a single image. Whereas a single image may include information such as a grid of color pixels and the date/time of capture, a multi-view interactive digital media representation includes information such as such as grids of color pixels, date/time of capture, spatial information (flow/3D), location, and inertial measurement unit information (IMU) (i.e., compass, gravity, orientation). A multi-view interactive digital media representation brings focus to an object of interest because it provides separation between the foreground and background. In addition, a multi-view interactive digital media representation provides more information about the scale, context, and shape of the object of interest. Furthermore, by providing multiple views, aspects of the object that are not visible from a single view can be provided in a multi-view interactive digital media representation.

In the present example embodiment, the surround view acquisition system 900 is depicted in a flow sequence that can be used to generate a surround view. According to various embodiments, the data used to generate a surround view can come from a variety of sources. In particular, data such as, but not limited to two-dimensional (2D) images 904 can be used to generate a surround view. These 2D images can include color image data streams such as multiple image sequences, video data, etc., or multiple images in any of various formats for images, depending on the application. Another source of data that can be used to generate a surround view includes location information 906. This location information 906 can be obtained from sources such as accelerometers, gyroscopes, magnetometers, GPS, Wi-Fi, IMU-like systems (Inertial Measurement Unit systems), and the like. Yet another source of data that can be used to generate a surround view can include depth images 908. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 910. In some embodiments, a surround view can be generated a combination of data that includes both 2D images 904 and location information 906, without any depth images 908 provided. In other embodiments, depth images 908 and location information 906 can be used together at sensor fusion block 910. Various combinations of image data can be used with location information at 906, depending on the application and available data.

In the present example embodiment, the data that has been fused together at sensor fusion block 910 is then used for content modeling 912 and context modeling 914. During this process, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 912 and context modeling 914 can be generated by combining the image and location information data.

According to various embodiments, context and content of a surround view are determined based on a specified object of interest. In some examples, an object of interest is automatically chosen based on processing of the image and location information data. For instance, if a dominant object is detected in a series of images, this object can be selected as the content. In other examples, a user specified target 902 can be chosen. It should be noted, however, that a surround view can be generated without a user specified target in some applications.

In the present example embodiment, one or more enhancement algorithms can be applied at enhancement algorithm(s) block 916. In particular example embodiments, various algorithms can be employed during capture of surround view data, regardless of the type of capture mode employed. These algorithms can be used to enhance the user experience. For instance, automatic frame selection, stabilization, view interpolation, filters, and/or compression can be used during capture of surround view data. In some examples, these enhancement algorithms can be applied to image data after acquisition of the data. In other examples, these enhancement algorithms can be applied to image data during capture of surround view data.

According to particular example embodiments, automatic frame selection can be used to create a more enjoyable surround view. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a surround view in a manner similar to that used for video. In particular, key frames in a surround view can be stabilized to produce improvements such as smoother transitions, improved/enhanced focus on the content, etc. However, unlike video, there are many additional sources of stabilization for a surround view, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a surround view. Because points of interest in a surround view are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for surround views. For instance, key points can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a surround view is often focused on a particular object of interest, a surround view can be content-weighted so that the object of interest is maximally stabilized in some examples.

Another way to improve stabilization in a surround view includes direct selection of a region of a screen. For instance, if a user taps to focus on a region of a screen, then records a convex surround view, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, mouth) can be used as areas to stabilize, rather than using generic key points.

According to various examples, view interpolation can be used to improve the viewing experience. In particular, to avoid sudden "jumps" between stabilized frames, synthetic, intermediate views can be rendered on the fly. This can be informed by content-weighted key point tracks and IMU information as described above, as well as by denser pixel-to-pixel matches. If depth information is available, fewer artifacts resulting from mismatched pixels may occur, thereby simplifying the process. As described above, view interpolation can be applied during capture of a surround view in some embodiments. In other embodiments, view interpolation can be applied during surround view generation.

In some examples, filters can also be used during capture or generation of a surround view to enhance the viewing experience. Just as many popular photo sharing services provide aesthetic filters that can be applied to static, two-dimensional images, aesthetic filters can similarly be applied to surround images. However, because a surround view representation is more expressive than a two-dimensional image, and three-dimensional information is available in a surround view, these filters can be extended to include effects that are ill-defined in two dimensional photos. For instance, in a surround view, motion blur can be added to the background (i.e. context) while the content remains crisp. In another example, a drop-shadow can be added to the object of interest in a surround view.

In various examples, compression can also be used as an enhancement algorithm 916. In particular, compression can be used to enhance user-experience by reducing data upload and download costs. Because surround views use spatial information, far less data can be sent for a surround view than a typical video, while maintaining desired qualities of the surround view. Specifically, the IMU, key point tracks, and user input, combined with the view interpolation described above, can all reduce the amount of data that must be transferred to and from a device during upload or download of a surround view. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a surround view 918 is generated after any enhancement algorithms are applied. The surround view can provide a multi-view interactive digital media representation. In various examples, the surround view can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, surround views provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with surround views that allow the surround views to be indexed with a high degree of efficiency and accuracy; and the ability of the user to interact and change the viewpoint of the surround view. In particular example embodiments, the characteristics described above can be incorporated natively in the surround view representation, and provide the capability for use in various applications. For instance, surround views can be used in applying filters or visual effects.

According to various example embodiments, once a surround view 918 is generated, user feedback for acquisition 920 of additional image data can be provided. In particular, if a surround view is determined to need additional views to provide a more accurate model of the content or context, a user may be prompted to provide additional views. Once these additional views are received by the surround view acquisition system 900, these additional views can be processed by the system 900 and incorporated into the surround view. With reference to FIG. 10, shown is an example of a device capturing multiple views of an object of interest from different locations. The capture device is indicated as camera 1012, and moves from location 1022 to location 1024 and from location 1024 to location 1026. The multiple camera views 1002, 1004, and 1006 captured by camera 1012 can be fused together into a three-dimensional (3D) model. According to various embodiments, multiple images can be captured from various viewpoints and fused together to provide a multi-view digital media representation.

In the present example embodiment, camera 1012 moves to locations 1022, 1024, and 1026, respectively, along paths 1028 and 1030, in proximity to an object of interest 1008. Scenery can surround the object of interest 1008 such as object 1008. Views 1002, 1004, and 1006 are captured by camera 1012 from locations 1022, 1024, and 1026 and include overlapping subject matter. Specifically, each view 1002, 1004, and 1006 includes the object of interest 1008 and varying degrees of visibility of the scenery surrounding the object 1010. For instance, view 1002 includes a view of the object of interest 1008 in front of the cylinder that is part of the scenery surrounding the object 1008. View 1004 shows the object of interest 1008 to one side of the cylinder, and view 1006 shows the object of interest without any view of the cylinder.

In the present example embodiment, the various views 1002, 1004, and 1006 along with their associated locations 1022, 1024, and 1026, respectively, provide a rich source of information about object of interest 1008 and the surrounding context that can be used to produce a multi-view digital media representation, such as a surround view. For instance, when analyzed together, the various views 1002, 1004, and 1006 provide information about different sides of the object of interest and the relationship between the object of interest and the scenery. These views also provide information about the relative size and scale of the object of interest in relation to the scenery. Furthermore, views from different sides of the object provide information about the shape and texture of the object. According to various embodiments, this information can be used to parse out the object of interest 1008 into content and the scenery 1010 as the context. In particular examples, the content can then be used for applying filters.

With reference to FIG. 11, shown is an example of a device capturing views of an object of interest. During a filter session, multiple views of the object 1008 may be captured by the device 1170 from different locations. In the present example, data is acquired when a user taps a record button 1180 on capture device 1170 to begin recording images of the object.

The user moves 1028 the capture device 1170 from location 1022 to location 1024 along path 1028 and from location 1024 to location 1026 along path 1030. As described in more detail throughout this application, filtering can be provided at the device 1170, and prompts for the user to capture particular views can be provided during the session. In particular, the system can prompt the user to move the device 1170 in a particular direction or may prompt the user to provide additional information. As the user records different views of the object, filtering suggestions may be reiteratively refined to provide accurate results. The user may choose to stop recording by tapping the record button 1180 again. In other examples, the user can tap and hold the record button during the session, and release to stop recording. In the present embodiment, the recording captures a series of images that can be used to generate a multi-view digital media representation that can be for filtering either in real-time or after-the-fact.

In some implementations, applying a filter to a multi-view digital media representation may involve processing a succession of images taken from different perspectives. In such an example, the client device may perform low-level processing such as two-dimensional analysis of individual images. The server, on the other hand, may perform high-level processing such as combining different individual images to produce a three-dimensional model of an object that is the subject of a multi-view video.

With reference to FIG. 12, shown is a particular example of a computer system that can be used to implement particular examples of the present invention. For instance, the computer system 1200 can be used to map views between images according to various embodiments described above. The computer system 1200 may be, for example, a server, a client machine, a mobile phone, a laptop, a desktop computer, or any other suitable device. According to particular example embodiments, a system 1200 suitable for implementing particular embodiments of the present invention includes a processor 1201, a memory 1203, a communications interface 1211, and a bus 1215 (e.g., a PCI bus). The interface 1211 may include separate input and output interfaces, or may be a unified interface supporting both operations. When acting under the control of appropriate software or firmware, the processor 1201 is responsible for such tasks such as optimization. Various specially configured devices can also be used in place of a processor 1201 or in addition to processor 1201. The complete implementation can also be done in custom hardware. The communications interface 1211 is typically configured to send and receive data packets or data segments over a network. Particular examples of interfaces the device supports include Ethernet interfaces, frame relay interfaces, cable interfaces, DSL interfaces, token ring interfaces, and the like. The storage device 1205 is configured to store information on one or more non-transitory storage media such as a hard disk or network attached storage system.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 1200 uses memory 1203 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

A variety of techniques and mechanisms may be used instead of, or in addition to, one or more techniques or mechanisms described herein. For example, in particular embodiments the system may extract full images of an object from specific angles. In such a configuration, the orientation of the object may be estimated. For instance, orientation estimation may be performed on a vehicle. The viewpoints that best correspond to the specific angles may then be returned. An object bounding box detector may be applied to crop out the region that contains the object, or at least delineate a tighter region around the object.

According to various embodiments, regions targeted for cropping or extraction may be defined in any of various ways. One such approach is to specify the regions in the top-down view. Another option is to specify the regions in given images of a car, which are then mapped onto a top-down view. In other approach, example images of desired crop results may be provided. These example images are then analyzed in a way that allows the extraction of the corresponding crop regions from novel images, videos, and/or multi-view captures.

In particular embodiments, bounding box detection for object parts may be performed on an input image to estimate which object parts are visible. Another approach is to use a neural network that directly maps each pixel of the provided image to a top-down view, and use the mapped information on the top-down view to specify the desired crop regions for novel images. Alternately, or additionally, a neural network may directly classify an input image as a specific object part. Alternatively, or additionally, a neural network may classify all pixels of the input image as specific object parts, which is then used to estimate a corresponding cropping region for novel images. Yet another approach is to implement a neural network that receives the input image and identifies the four corners of the specified crop in a top-down view. Still another approach involves applying a neural network to both a reference image with the desired crop and an input image and then directly output the cropped image.

In particular embodiments, when the input data to such any of the techniques described herein includes a multi-view representation, points near the locations that are too be extracted may be tracked across images. Such point tracking may facilitate the smoothing of the location of the area to extract and/or the construction of a multi-view crop that is more stable than would otherwise be the case. Alternately, or additionally, a neural network may receive the result from a previous image as an input and combine that result with the current image to provide an improved fitting result from the current image.

According to various embodiments, techniques and mechanisms described herein may involve the use of additional sensor data to obtain improved results. For example, a depth sensor, an additional camera, IMU data, or other such information may be used.

FIG. 13 illustrates a method 1300 of determining an orientation of an object, performed in accordance with one or more embodiments. The method 1300 may be performed on any suitable computing device. For example, the method 1300 may be performed on a mobile computing device such as a smartphone. Alternately or additionally, the method 1300 may be performed on a remote server in communication with a mobile computing device.

A request to determine an orientation of an object is received at 1302. According to various embodiments, the request may be received at a user interface. For example, the request may be received via an application at a mobile computing device. As another example, the request may be received at a user interface at a laptop.

At 1304, an image of the object is selected for analysis. According to various embodiments, the image may be a single two-dimensional image of the object. Alternately or additionally, the image may be one of a series of two-dimensional images of the object captured from different viewpoints. In some implementations, the image may be a single frame of a video stream of the object. In some embodiments, the image may be a 360-degree multi-view capture of the object. Alternately, the image may include a view that has less than 360-degree coverage.

Optionally, a bounding box for the object is determined at 1306. According to various embodiments, a bounding box for the object may include coordinates of a rectangular or non-rectangular border that encloses the object in the selected image. The bounding box may be determined by a neural network. For example, a neural network may be trained to determine the coordinates of the visible object pixels in an image of the object. The neural network may facilitate the determination of the pixel coordinates and the width, height, or other characteristics of the bounding box enclosing the object. Alternately or additionally, the bounding box may be determined by a different type of algorithm. In some configurations, the bounding box may be determined at least in part based on user input. For example, the bounding box may be determined by a user super-imposing a border on the image to enclose the object. In another example, the bounding box may be determined by the user tapping on the object with an algorithm automatically estimating the extent of the bounding based on the selection. In yet another example, the user may select points or regions in the foreground and background, and an algorithm automatically separates both to estimate the extent of a corresponding bounding box.

At 1308, an estimated object orientation is determined. According to various embodiments, the estimated object orientation may be determined by a neural network. For example, a neural network may be trained to determine the estimated object orientation through an analysis of the object from one or more images of an object. The estimated object orientation may include estimates about an object's roll, elevation, angular position, attitude, and azimuth angle.

An estimated camera orientation is identified at 1310. According to various embodiments, camera orientation may be estimated from data collected from an inertial measurement unit (IMU). In some implementations, the IMU may be associated with a mobile computing device, such as a smartphone. For example, a mobile computing device may include sensors such as a camera capable of capturing visual data such as an image or video stream. A mobile computing device may also include an accelerometer, a gyroscope, and other such sensors capable of capturing IMU data. IMU data may include information such as camera location, camera angle, device velocity, device acceleration, or any of a wide variety of data collected from accelerometers or other such sensors.

In some implementations, IMU orientation may identify orientation information associated with the camera. The IMU orientation may then be used to infer orientation information about the object. For example, the IMU orientation may indicate that the image was captured with a camera located at a particular height and angle relative to the object and/or ground. Alternatively, or additionally, the orientation estimation might be done using a pose estimation algorithm based on image data. In some configurations, the pose estimation method might also consider the available IMU data.

At 1312, an offset is determined between the estimated object orientation and the estimated camera orientation. According to various embodiments, the determination may be made at least in part by identifying a difference between the two values. Alternately, or additionally, the determination may be made at least in part by refining the object orientation based on additional information characterizing the position and angle of the camera.

A determination is made at 1314 as to whether to select an additional image of the object for analysis. In some implementations, additional images may be selected until all available images have been analyzed. For example, each image associated with a multi-view capture may be analyzed. If multiple images have been processed, then a combined offset may be to be calculated. For example, the offset can be averaged from the results obtained from multiple images. In another example, a robust method for estimating the final offset from multiple computed offsets might be used, for instance to handle outliers such as an inaccurate orientation estimation for certain images.

In some embodiments, the determination made at 1314 may be made at least in part automatically. For example, the estimated object orientation procedure at 1308 may attempt to estimate an orientation for the object, but may fail due to incomplete image information or other information. A determination may be automatically made to prompt the user to capture or upload additional images of the object.

In some implementations, the determination made at 1314 may be made at least in part as a request by a user. For example, a user may be prompted to select an additional image for analysis. Alternatively or additionally, a user may be prompted to review an estimated object orientation, and a user may review the estimated object orientation and may elect to analyze additional images of the object in order to improve the accuracy or quality of the estimated object orientation. In some implementations, every N-th frame of the multi-view capture might be processed.

At 1316, the orientation estimation information is stored. According to various embodiments, storing the orientation estimation information may involve storing one or more orientation values for each of the images analyzed in FIG. 13. For example, orientation information may be stored to supplement a multi-view capture.

In some implementations, the orientation estimation may be stored on a storage device. Alternately, or additionally, the orientation estimation may be transmitted to a remote location via a network.

According to various embodiments, one or more operations shown in FIG. 13 may be omitted. For example, any or all of operations 1310 and 1312 may be omitted.

FIG. 14 illustrates a method for determining an object orientation based on 3D data. The method 1400 may be performed on any suitable computing device. For example, the method 1400 may be performed on a mobile computing device such as a smartphone. Alternately or additionally, the method 1400 may be performed on a remote server in communication with a mobile computing device.

A request to determine an orientation of an object is received at 1402. In some implementations, the request may be received at a user interface. At 1404, image information for the object is captured. In some implementations, the image information may include a video or image set of the object is captured from multiple perspectives. The image information may include a 360-degree view of the object. Alternately, the image information may include a view that has less than 360-degree coverage.

An object is identified for analysis at 1406. In some embodiments, the object may be identified via an algorithm. For example, the object may be identified via an image recognition algorithm. As another example, the object may be identified via a bounding box algorithm.

In some implementations, the object may be identified based at least in part on user input. For instance, a user may identify the object as a vehicle via a user interface component such as a drop-down menu.

At 1408, one or more points of reference are identified on the object. According to various embodiments, points of reference may include one or more fiducial points on the object. Fiducial points are identifiable locations on objects of a particular type that in general should be present on all or nearly all objects of that type and that provide an indication as to the object's orientation. For example, in the case of a vehicle, fiducial points may include but are not limited to the vehicle's headlights, rearview mirror, and wheels.

In some implementations, the reference points may be identified via an algorithm, such as an image recognition algorithm. Alternatively or additionally, reference points may be identified in part through user input.

A sparse 3D mesh of an object is determined at 1410. According to various embodiments, the sparse 3D mesh may be determined by using the fiducial points identified in operation 1408 as vertices of the mesh. For example, each face of the mesh may approximate the object shape with a planar surface.

At 1412, a 3D representation of the object is determined. According to various embodiments, the 3D representation may be constructed by elevating the fiducial points to 3D space and constructing a sparse 3D mesh from their locations. Alternatively, or additionally, the object's orientation may be inferred based on cues such as surface normal of the faces of the mesh, visibility states of the fidicual points in a plurality of image, or other such features.

In some embodiments, the elevation into 3D space might be done using triangulation. Alternately, or additionally, a depth map might be computed for each frame which is then used to elevate the 14D points into 3D.

According to various embodiments, the 3D representation may be a 3D skeleton. For example, 14D skeleton detection may be performed on every frame using a machine learning procedure. As another example, 3D camera pose estimation may be performed to determine a location and angle of the camera with respect to the object for a particular frame. As yet another example, a 3D skeleton may be reconstructed from one or more 2D skeletons and/or one or more 3D models.

According to various embodiments, the 3D reconstruction of the object surface may include one or more of a variety of reconstruction procedures. For example, dominant axes may be computed to estimate orientation. As another example, an object model such as a vehicle model that has a reference orientation may be fit into a 3D reconstructed model based on the input data. As another example, one or more parts of a 3D reconstructed model may be classified to estimate an orientation of the object.

Estimated orientation for the object is determined at 1414. According to various embodiments, the estimated object orientation may be determined by a neural network. For example, a neural network may be trained to determine the estimated object orientation through an analysis of the object from one or more images of an object. The estimated object orientation may include estimates about an object's dominant axes, roll, elevation, angular position, attitude, and azimuth angle.

According to various embodiments, the object orientation may be estimated based on the sparse 3D mesh determined at operation 1410 and/or the 3D skeleton determined at operation 1412. For example, the fiducial points identified in operation 1408 facilitate the triangulation of fiducial points of the object in 3D space to help determine the azimuth, roll, elevation, and axes of the designated object. The 3D skeleton may facilitate the inference of the object's orientation based on cues such as, but not limited to, the surface normals of the faces of the mesh, and the visibility states of the fiducial points in the images of the object, and information about the three axes of the 3D skeleton model determined at operation 1412.

In some embodiments, the estimated object orientation may be determined based on a 3D reconstruction of the object. For example, the object orientation may be estimated based on the dominant axes of the 3D reconstruction of an object. As another example, the orientation for a designated object may be estimated by incorporating the orientation of a known reference object with reference orientation with a 3D reconstructed model of the designated object. As yet another example, parts of the 3D reconstructed model may be identified to determine orientation of the object. For example, in the case of a vehicle, the license plate may be identified as a reference point relative to the rearview mirror to estimate the orientation of the vehicle.

At 1416, the orientation estimation information is stored. In some implementations, the orientation estimation may be stored on a storage device. Alternately, or additionally, the orientation estimation may be transmitted to a remote location via a network.

According to various embodiments, the object orientation may be estimated based on the determination of specific reference points on the object. For example, in the case of a vehicle, a specific reference point such as the license plate may be detected in one or more images of a multi-view image set. Based on the location of the license plate in the image relative to other reference points, such as the vehicle's headlights, the orientation of the object may be inferred.

In some implementations, this determination may be performed on a 3D model of the object. For example, for a 3D model of a vehicle, the location of the license plate may be used to estimate global angle for the vehicle. Alternately, or additionally, the trajectory of a feature such as a license plate may be fit to an ellipse in image space, which corresponds to a sphere around the vehicle in 3D space, and the location on the ellipse is used to estimate the vehicle's orientation.

In some embodiments, the estimated object orientation may be determined from a single image. In some implementations, the object may not be visible from all angles or perspectives from a single image, or an image may not supply a minimum number of reference points visible to determine a sparse 3D mesh capable of facilitating the determination of a 3D skeleton of the object. In such situations, a neural network may be trained to predict coordinates of the visible object pixels in a top-down view of the object.

In particular embodiments, once the locations are mapped, the points may be lifted to 3D based on a predefined correspondence between the top-down view and a 3D mesh. Then, the transformation between the image points and the 3D mesh may be used to obtain the 3D orientation of the vehicle.

According to various embodiments, the estimated object orientation may be determined from a single image via top-down view mapping. For example, a network may be trained that takes an image of an object such as a vehicle as input and maps every point of the image onto a top-down view. Based on the distribution of the points on the top-down view, the system may then draw an inference about the orientation of the object with respect to the camera.

According to various embodiments, orientation may be estimated from a single image using a component classifier. For example, a network may be trained to identify object components such as car parts. For instance, each pixel of the image may be classified as belonging to an object component or as part of the background. The visible object components may then be used to estimate an orientation of the object.

According to various embodiments, the object orientation may be directly estimated from the detected 2D skeleton by considering which joints of the 2D skeleton are detected (i.e. are visible).

In some implementations, the estimated object orientation may be determined from a single image via using a neural network trained directly to determine an N degree-of-freedom pose. For example, a 3 degree-of-freedom pose may include azimuth, roll, and elevation. As another example, a 6 degree-of-freedom pose may include 3 degrees of freedom for orientation and 3 degrees of freedom for translation. As another example, a combination of 3 degrees of freedom for translation and 3 degrees of freedom for position may be used. For instance, a 2 degree-of-freedom pose may include 1 degree-of-freedom for orientation and 1 degree-of-freedom for the distance between the camera and the object.

In particular embodiments, any of the approaches involving a single image may be applied on a multi-view data set and the results combined (e.g., averaged) to improve the overall results. In general, any combination of the methods described herein may be used to increase robustness and/or provide a failsafe. For example, orientation may be independent estimated using three different methods, and then the results cross-checked.

Although particular features have been described as part of each example in the present disclosure, any combination of these features or additions of other features are intended to be included within the scope of this disclosure. Accordingly, the embodiments described herein are to be considered as illustrative and not restrictive. Furthermore, although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention.

The invention claimed is:

1. A method comprising:
   receiving a request to generate a multi-view panel of a designated object component, the request identifying a plurality of designated viewpoints of the designated object component, each of the designated viewpoints specifying a respective camera pose with respect to the designated object component, wherein the respective camera pose includes a respective rotational angle identifying a respective degree of rotation of the viewpoint relative to a designated fixed position of an object;
   identifying via a processor respective component information for each of a plurality of input images of the object, the respective component information indicating a respective portion of the respective input image in which the designated component of the object is depicted;
   determining a respective viewpoint for each input image via the processor, the respective viewpoint indicating a respective camera pose for the respective input image relative to the object;
   determining via the processor a three-dimensional skeleton of the object based on the respective viewpoints, a top-down view of the object, and the respective component information, wherein the three-dimensional skeleton is determined by putting each of the plurality of input images in a neural network, detecting a two-dimensional skeleton in each of the plurality of input images using the neural network, and combing the two-dimensional skeletons to form the three-dimensional skeleton;
   creating a 3D mesh from the three-dimensional skeleton;
   mapping each of the input images to a top-down view of the object at least in part by projecting a plurality of pixels in the input images onto the three-dimensional skeleton of the object, wherein mapping each of the input images to the top-down view includes selecting a pixel in a perspective frame, projecting the pixel onto the 3D mesh by simulating a camera ray passing by the pixel's position into the 3D mesh, and extracting barycentric coordinates of an intersection point with respect to vertices of an intersection face;
   evaluating via the processor the plurality of input images based on the mapping of the input images to the top-down view to select a subset of the images that includes the designated object component and that is associated with a respective viewpoint that matches one or more of the designated viewpoints; and
   storing on a storage device a multi-view panel including portions of the selected subset of the images in which the designated component of the object is depicted.

2. The method recited in claim 1, wherein the multi-view panel is generated based on target viewpoint information defined in the top-down view of the object.

3. The method recited in claim 1, wherein the plurality of images form a multi-view capture of the object navigable in three dimensions, the multi-view capture constructed based in part on inertial measurement unit (IMU) data collected from an IMU in a mobile phone.

4. The method recited in claim 1, wherein the object is a vehicle, and wherein the three-dimensional skeleton includes a door and a windshield.

5. The method recited in claim 1, wherein the respective viewpoint further includes a respective distance of the camera from the object.

6. The method recited in claim 1, wherein the respective camera pose includes a respective vertical angle identifying a respective angular height of the viewpoint relative to a 2D plane parallel to a surface on which the object is situated.

7. The method recited in claim 1, wherein the respective camera pose includes a respective position identifying a respective position of the viewpoint relative to a designated fixed position of the object.

8. A computing system comprising:
   a processor configured to:
      receive a request to generate a multi-view panel of a designated object component, the request identifying a plurality of designated viewpoints of the designated object component, each of the designated viewpoints specifying a respective camera pose with respect to the designated object component, wherein the respective camera pose includes a respective rotational angle identifying a respective degree of rotation of the viewpoint relative to a designated fixed position of an object;
      identify respective component information for each of a plurality of input images of the object, the respective component information indicating a respective portion of the respective input image in which the designated component of the object is depicted,
      determine a respective viewpoint for each input image, the respective viewpoint indicating a respective camera pose for the respective input image relative to the object,
      determine a three-dimensional skeleton of the object based on the respective viewpoints, a top-down view of the object, and the respective component information, wherein the three-dimensional skeleton is determined by putting each of the plurality of input images in a neural network, detecting a two-dimensional skeleton in each of the plurality of input images using the neural network, and combing the two-dimensional skeletons to form the three-dimensional skeleton,
      create a 3D mesh from the three-dimensional skeleton;
      map each of the input images to a top-down view of the object at least in part by projecting a plurality of pixels in the input images onto the three-dimensional skeleton of the object, wherein mapping each of the input images to the top-down view includes selecting a pixel in a perspective frame, projecting the pixel onto the 3D mesh by simulating a camera ray passing by the pixel's position into the 3D mesh, and extracting barycentric coordinates of an intersection point with respect to vertices of an intersection face, and
      evaluate the plurality of images based on the mapping of the input images to the top-down view to select a subset of the images that includes the designated object component and that is associated with a respective viewpoint that matches one or more of the designated viewpoints; and a storage device configured to store a multi-view panel including portions of the selected subset of the images in which the designated component of the object is depicted.

9. The computing system recited in claim 8, wherein the respective viewpoint further includes a respective distance of the camera from the object.

10. The computing system recited in claim 8, wherein the respective camera pose includes a respective vertical angle identifying a respective angular height of the viewpoint relative to a 2D plane parallel to a surface on which the object is situated.

11. One or more computer readable media having instructions stored thereon for performing a method, the method comprising:
  receiving a request to generate a multi-view panel of a designated object component, the request identifying a plurality of designated viewpoints of the designated object component, each of the designated viewpoints specifying a respective camera pose with respect to the designated object component, wherein the respective camera pose includes a respective rotational angle identifying a respective degree of rotation of the viewpoint relative to a designated fixed position of an object;
  identifying via a processor respective component information for each of a plurality of input images of the object, the respective component information indicating a respective portion of the respective input image in which the designated component of the object is depicted;
  determining a respective viewpoint for each input image via the processor, the respective viewpoint indicating a respective camera pose for the respective input image relative to the object;
  determining via the processor a three-dimensional skeleton of the object based on the respective viewpoints, a top-down view of the object, and the respective component information, wherein the three-dimensional skeleton is determined by putting each of the plurality of input images in a neural network, detecting a two-dimensional skeleton in each of the plurality of input images using the neural network, and combing the two-dimensional skeletons to form the three-dimensional skeleton;
  creating a 3D mesh from the three-dimensional skeleton;
  mapping each of the input images to a top-down view of the object at least in part by projecting a plurality of pixels in the input images onto the three-dimensional skeleton of the object, wherein mapping each of the input images to the top-down view includes selecting a pixel in a perspective frame, projecting the pixel onto the 3D mesh by simulating a camera ray passing by the pixel's position into the 3D mesh, and extracting barycentric coordinates of an intersection point with respect to vertices of an intersection face;
  evaluating via the processor the plurality of images based on the mapping of the input images to the top-down view to select a subset of the images that includes the designated object component and that is associated with a respective viewpoint that matches one or more of the designated viewpoints; and
  storing on a storage device a multi-view panel including portions of the selected subset of the images in which the designated component of the object is depicted.

12. The one or more computer readable media recited in claim 11, wherein the respective viewpoint further includes a respective distance of the camera from the object, wherein the respective camera pose includes a respective vertical angle identifying a respective angular height of the viewpoint relative to a 2D plane parallel to a surface on which the object is situated, wherein the respective camera pose includes a respective rotational angle identifying a respective degree of rotation of the viewpoint relative to a designated fixed position of the object.

* * * * *